(12) United States Patent
Shimazawa

(10) Patent No.: US 6,233,127 B1
(45) Date of Patent: May 15, 2001

(54) THIN FILM DEVICE PROVIDED WITH MEANS FOR ELECTROSTATIC BREAKDOWN PREVENTION

(75) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/285,761

(22) Filed: Apr. 5, 1999

(30) Foreign Application Priority Data

Apr. 22, 1998 (JP) .................................................. 10-112576

(51) Int. Cl.⁷ .................................................. G11B 5/127

(52) U.S. Cl. .......................................... 360/323; 360/319

(58) Field of Search ..................................... 360/323, 319

(56) References Cited

U.S. PATENT DOCUMENTS 5,761,009 * 6/1998 Hughbanks et al. .................. 360/323

* cited by examiner

*Primary Examiner*—Allen T. Cao
(74) *Attorney, Agent, or Firm*—Oblon, Spivak, McClelland, Maier & Neustadt, P.C.

(57) ABSTRACT

The present invention is directed to a thin film device in which a function of electrostatic breakdown prevention can be enabled or disabled with ease and at which a member for electrostatic breakdown prevention can be externally provided with ease. The thin film device includes a thin film element, at least two lead conductors and a member for switching. The lead conductors, each connected to the thin film element at one end, are respectively connected to output terminals at the other ends. The member for switching, which is connected between the lead conductors performs a switching operation on energy supplied from the outside to prevent any electrostatic breakdown of the thin film element.

61 Claims, 20 Drawing Sheets

THIN FILM DEVICE PROVIDED WITH MEANS FOR ELECTROSTATIC BREAKDOWN PREVENTION

BACKGROUND OF THE INVENTION

1. Field of the Invention

The present invention relates to a thin film device provided with a means for electrostatic breakdown prevention.

2. Discussion of Background

The current-carrying capacities of various types of thin film elements such as semiconductor integrated circuit elements and thin film magnetic transducers are extremely small. As a result, if an electrostatic charge in the body of a worker handling a thin film element is applied to the thin film element during a manufacturing or assembly process, excess current will flow into the thin film element, which may readily cause electrostatic breakdown. Furthermore, the various characteristics of the thin film element may be altered by the excess current or a magnetic field, heat or the like caused by the excess current.

A specific explanation is now given by citing a thin film magnetic head employing a magnetoresistive film as a read element as an example. Magnetic multi-layer films constituted by laminating magnetic layers and non-magnetic layers and achieving a high degree of magnetoresistance effect have attracted much attention and have been put into practical use in thin film magnetic heads, as a means for supporting greater sensitivity and higher output of the magnetoresistive film. The most prominent examples among such magnetic multi-layer films are spin valve films that achieve a high degree of reproduction sensitivity. Examples of publications of the known art related to spin valve films include PHYSICAL REVIEW B vol. 43, page 1297, 1991, Journal of Applied Physics, vol. 69, page 4774, 1991 and Japanese Patent Publication (KOKAI) No. 358310/1992.

A spin valve film normally adopts a film structure constituted of NiFe/Cu/(NiFe or Co)/FeMn. A spin valve film, in which, while the magnetization of the magnetic layer (pinned layer) in contact with the antiferromagnetic layer (pin layer) is fixed, the magnetization of the other magnetic film (free layer) is made to rotate freely by an external magnetic field to achieve a non-parallel state for the magnetization, obtains a high degree of magnetoresistance effect.

However, the current-carrying capacity of a spin valve film is extremely small. As a result, if an electrostatic charge in the body of a worker handling a magnetic head assembly is applied to the magnetic head assembly during a manufacturing or assembly process, an excess current will flow into the spin valve film, which may readily cause electrostatic breakdown.

In addition, the magnetoresistance effect of the spin valve film is determined by the rotating angle of the direction of the magnetization of the free layer relative to the direction of the fixed magnetization of the pinned layer in contact with the antiferromagnetic layer. If an electrostatic charge is introduced to a spin valve film having such a structure, the direction of the fixed magnetization of the pinned layer is caused to change depending on the direction in which the charge travels or by a magnetic field, heat or the like caused by the traveling electric charge. If the direction of the fixed magnetization of the pinned layer is altered, the degree of the magnetoresistance effect is also altered and specific reproduction characteristics cannot be achieved.

As a means for preventing electrostatic breakdown in a thin film magnetic head, Japanese Unexamined Patent Publication No. 85422/1995 discloses a technology whereby an inductive thin film element and a magnetoresistive thin film element are shorted by a $10^3$ Ωcm to $10^6$ Ωcm substance and at least one diode is connected between a pair of terminals that are connected to the magnetoresistive film. A problem of this prior art technology arises in that, during the process of manufacturing the magnetic head, a resistive material for shorting the inductive thin film element and the magnetoresistive thin film element must be provided inside the thin film magnetic head.

In addition, Japanese Patent Publication (KOKAI) No. 141636/1995 discloses a technology wherein two terminals connected to the magnetoresistive film are shorted in a structure employing a flexible printed board as a lead conductor for the magnetoresistive film during the manufacturing and assembly work and the flexible printed board is cut off to open a shorted portion prior to the characteristics measurement process which follows the assembly work. The characteristics measurement work is conducted in a state in which the shorted portion is opened by cutting off the flexible printed board.

The problem of this prior art is that in order to prevent an electrostatic charge which may occur after the characteristics measurement process and an electrostatic breakdown that may result, the means for electrostatic breakdown prevention that has been lost must be reconstituted for the characteristics measurement. Since there is a risk of a charge being introduced during the transporting of the product from the manufacturer to the user, during the acceptance inspection conducted at the user, during the assembly into the magnetic disk device and the like, for instance, which may cause electrostatic breakdown and a resulting alteration in characteristics, the means for electrostatic breakdown that has been lost must be reconstituted for the characteristics measurement work in order to avoid such a risk.

SUMMARY OF THE INVENTION

It is an object of the present invention to provide a thin film device in which a function of electrostatic breakdown prevention can be enabled or disabled with ease.

It is a further object of the present invention to provide a thin film device in which a means for electrostatic breakdown prevention can be externally added to the thin film element with ease.

In order to achieve the objects described above, the thin film device according to the present invention includes a thin film element, at least two lead conductors and at least one means for switching. The lead conductors are connected to the thin film element. The means for switching, which is connected to the lead conductors, performs a switching operation on an energy provided from the outside to prevent electrostatic breakdown of the thin film element.

In the thin film device described above, in which the lead conductors are connected to the thin film element, the signal output from the thin film element or the signal input to the thin film element can be implemented through the lead conductors.

The means for switching performs a switching operation based upon energy provided from the outside. In other words, the means for switching can be caused to perform a switching operation by supplying energy to the means for switching from the outside or by stopping the energy supply.

The means for switching is connected to the lead conductors and prevents electrostatic breakdown of the thin film element through its switching operation. In more specific terms, in response to the switching operation performed by the means for switching, the lead conductors connected to the thin film element are shorted or an open state is achieved for the circuit loop that includes the lead conductors and the thin film element. Thus, even if an electrostatic charge in the body of a worker is introduced to the lead conductors during a manufacturing or assembly process, no excess current will flow into the thin film element. As a result, electrostatic breakdown of the thin film element and change in its characteristics can be prevented. The means for supplying energy to the means for switching may be either provided at the thin film device itself or may be provided separately from the thin film device.

During the process of transporting the product from the manufacturer to the user, during the acceptance inspection conducted at the user, during the assembly into a magnetic disk device and the like, too, an electric charge and electrostatic breakdown and change in characteristics that may result can be prevented.

When providing the thin film element with a signal or taking out a signal from the thin film element for the characteristics measurement work or the like, a normal signal transmission line extending from the thin film element toward the output terminal can be constituted by supplying energy to the means for switching or by stopping the energy supply.

As explained above, through an easy operation of supplying energy to the means for switching from the outside or stopping the energy supply, a function of electrostatic breakdown prevention can be enabled or disabled with ease. Furthermore, the function of electrostatic breakdown prevention can be added with ease by simply adding the means for switching to the thin film element from the outside.

A desirable example of the means for switching that constitutes the means for electrostatic breakdown prevention is a thermistor element having a positive temperature coefficient (hereafter referred to as a PTC thermistor element). Thermal energy is provided as the energy for controlling the PTC thermistor element. The PTC thermistor element may be directly heated by employing a means for heating.

As an alternative, a heating PTC thermistor element may be provided to achieve a structure in which thermal energy is provided by the heating PTC thermistor element to the PTC thermistor element constituting the means for switching.

The means for switching may include a thermistor element having a negative temperature coefficient (hereafter referred to as an NTC thermistor element).

The means for switching element may include a semiconductor switch. In this case, the semiconductor switch may be constituted by combining a phototransistor and a light emitting element (a photocoupler), or it may be constituted of a phototransistor or a three-terminal switching element. Alternatively, a mode that includes a mechanical means for switching may be adopted.

According to the present invention, the thin film element may be constituted of a semiconductor integrated circuit element or a magnetoresistive film. If the thin film element is constituted of a magnetoresistive film, the present invention may be adopted in a magnetoresistive film having a multi-layer film structure to achieve an outstanding advantage. A typical example of a magnetoresistive film adopting a multi-layer film structure is a magnetoresistive film having a spin valve film structure. Such a magnetoresistive film is employed as a reproduction element in a thin film magnetic head.

BRIEF DESCRIPTION OF THE DRAWINGS

More specific features and advantages of the present invention are explained in further detail in reference to the attached drawings, wherein.

DETAILED DESCRIPTION OF THE PREFERRED EMBODIMENTS

Figure 1:
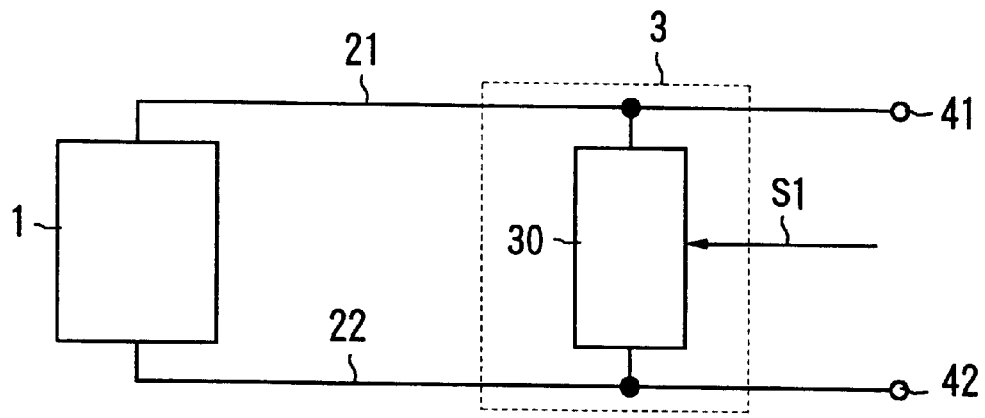
FIG. 1 is a schematic block diagram of the thin film device according to the present invention.

FIG. 1 is a schematic structure of the thin film device according to the present invention. As illustrated in the figure, the thin film device according to the present invention includes a thin film element 1, at least two lead conductors 21 and 22 and a means for switching 3. The lead conductors 21 and 22 are each connected, at one end, to the thin film element 1. The other ends of the lead conductors 21 and 22 are led to output terminals 41 and 42 respectively.

In this embodiment, the means for switching 3 is constituted of a switching element 30 connected between the lead conductors 21 and 22, and performs a switching operation on energy S1 provided from the outside to constitute a circuit that prevents electrostatic breakdown of the thin film element.

In the thin film device described above, since the lead conductors 21 and 22 are each connected to the thin film element 1 at one end with their other ends connected to the output terminals 41 and 42 respectively, the signal output from the thin film element 1 and the signal input to the thin film element 1 can be implemented through the output terminals 41 and 42 and the lead conductors 21 and 22.

The switching element 30 performs the switching operation based upon the energy S1 provided from the outside. In other words, the means for switching 3 can be made to perform a switching operation by supplying the energy S1 to the switching element 30 from the outside or by stopping the energy supply.

In the embodiment, in which the switching element 30 is connected between the lead conductors 21 and 22, the lead conductors 21 and 22 connected to the thin film element 1 are shorted by the switching element 30 when the switching element 30 is set in a closed state by the energy S1 provided from the outside. Thus, even if an electrostatic charge in the body of a worker is introduced via the output terminals 41 and 42 during a manufacturing or assembly process, it is shorted by the means for switching 3 and therefore, does not flow into the thin film element 1. Consequently, electrostatic breakdown of the thin film element 1 and change in its characteristics can be prevented.

During the process of transporting the product from the manufacturer to the user, during the acceptance inspection conducted at the user, during assembly into a magnetic disk device and the like, too, any electrical charge that may cause electrostatic breakdown and the change in the characteristics that may result can be prevented as long as the switching element 30 remains in a closed state.

The energy S1 that sets the switching element 30 in an open state should be supplied when providing the thin film element 1 with a signal or when a signal is taken out from the thin film element 1 for the characteristics measurement work or the like, since this will constitute a normal signal transmission line between the thin film element 1 and the output terminals 41 and 42 to accommodate the characteristics measurement work.

As described above, the function of electrostatic breakdown prevention can be enabled or disabled through a simple operation of supplying the energy S1 from the outside to the switching element 30 and stopping the energy supply. Furthermore, the function of electrostatic breakdown prevention can be added with ease simply by externally providing the thin film element 1 with the switching element 30.

Figure 2:
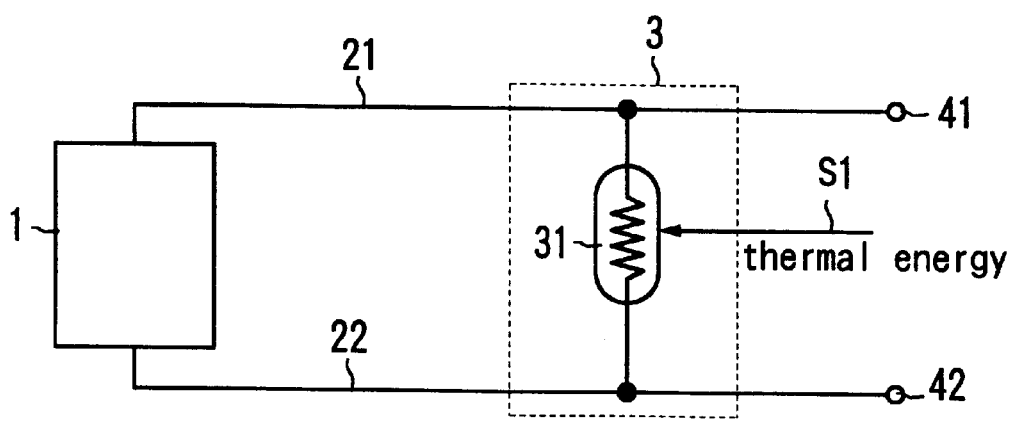
FIG. 2 illustrates a specific embodiment of the thin film device according to the present invention.

FIG. 2 illustrates a specific embodiment of the thin film device according to the present invention. In the figure, the same reference numbers are assigned to components identical to those illustrated in FIG. 1. In this embodiment, the means for switching 3 is constituted of a PTC thermistor element 31. Thermal energy is provided as the energy S1 supplied to the PTC thermistor element 31. In this embodiment, the PTC thermistor element 31 is directly heated by a means for heating.

An advantage of constituting the means for switching 3 with the PTC thermistor element 31 is that since the PTC thermistor element 31 operates as a low resistor (at several $\Omega$, for instance) at normal temperature to set a shorted state between the lead conductors 21 and 22, it is not necessary to supply the energy S1 from the outside for electrostatic breakdown prevention. This means that in various situations in which an electrostatic charge may occur such as during the manufacturing and assembly processes, during the process of transporting the product from the manufacturer to the user, during the acceptance inspection conducted at the user and during the assembly into a magnetic disk device, any electrical charge that may cause electrostatic breakdown and the change in the characteristics that may result can be prevented without having to provide the energy S1 from the outside.

Figure 3:
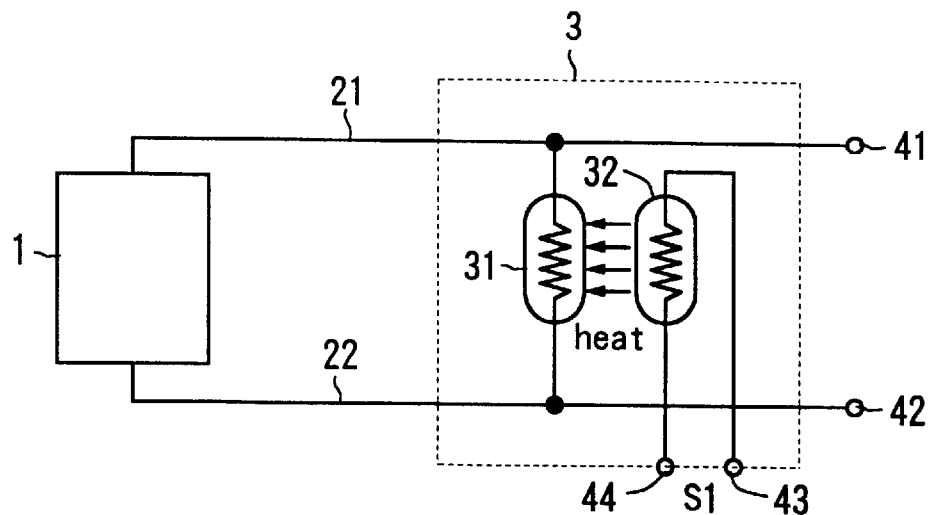
FIG. 3 illustrates another embodiment of the thin film device according to the present invention.

FIG. 3 illustrates another embodiment of the thin film device according to the present invention. In the figure, the same reference numbers are assigned to components identical to those illustrated in FIGS. 1 and 2. In this embodiment, the means for switching 3 is constituted of a heating PTC thermistor element 32 and a PTC thermistor element 31. The heating PTC thermistor element 32 provides the PTC thermistor element 31 with thermal energy. The heating PTC thermistor element 32 is driven by an electrical signal S1 provided from the outside.

Figure 4:
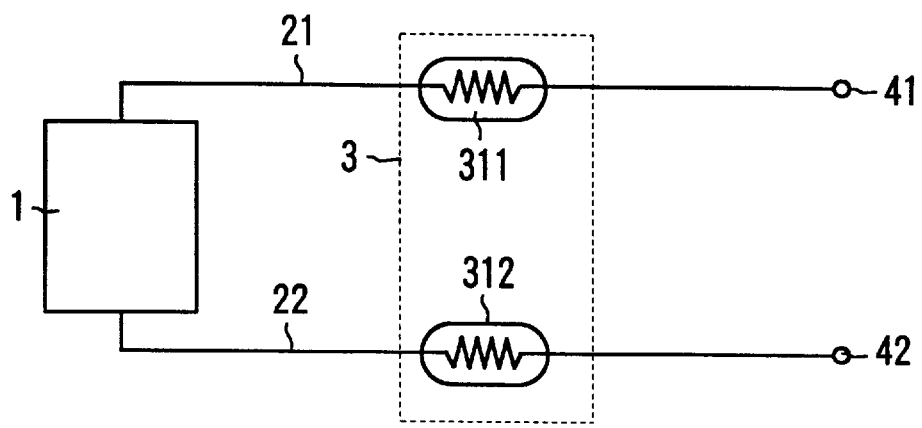
FIG. 4 illustrates yet another embodiment of the thin film device according to the present invention.

FIG. 4 illustrates yet another embodiment of the thin film device according to the present invention. In the figure, the same reference numbers are assigned to components identical to those illustrated in FIGS. 1 to 3. In this embodiment, the means for switching 3 is constituted of thermistor elements each having an NTC thermistor element 311 and 312. The NTC thermistor elements 311 and 312 are respectively connected in series with the lead conductors 21 and 22. While two NTC thermistor elements 311 and 312 are provided in the embodiment, the thin film device may be provided with one NTC thermistor element or two or more NTC thermistor elements.

When the means for switching 3 is constituted of the NTC thermistor elements 311 and 312, the drive timing is reversed from that of the means for switching constituted of a PTC thermistor element. Namely, the NTC thermistor elements 311 and 312 have a high resistance value and are in an open state at normal temperature. They need to be provided with thermal energy to perform a close operation.

As explained above, since the NTC thermistor elements 311 and 312 have a high resistance value and are in an open state at normal temperature, the NTC thermistor elements 311 and 312 should be kept at normal temperature when it is necessary to prevent electrostatic breakdown. As long as this state is sustained, even if an electrostatic charge in the body of a worker is introduced via the output terminals 41 and 42 during a manufacturing or assembly process, the current limiting effect achieved by the NTC thermistor elements 311 and 312 having a high resistance value is imparted to ensure that no excess current will flow into the thin film element 1. Consequently, electrostatic breakdown of the thin film element 1 and change in its characteristics can be prevented.

During the process of transporting the product from the manufacturer to the user, during the acceptance inspection conducted at the user, during the assembly into a magnetic disk device and the like, too, any electrical charge that may cause electrostatic breakdown and the change in the characteristics that may result can be prevented.

Thermal energy should be supplied to the NTC thermistor elements 311 and 312 when providing the thin film element 1 with a signal or taking out a signal from the thin film element 1 for characteristics measurement work or the like, since the thermal energy will reduce the resistance values of the NTC thermistor elements 311 and 312 to constitute a normal signal transmission line between the thin film element 1 and the output terminals 41 and 42 which will, in turn, accommodate the characteristics measurement work.

As explained above, the function of the electrostatic breakdown prevention can be enabled or disabled through a sample operation of supplying the thermal energy from the outside to the NTC thermistor elements 311 and 312 constituting the means for switching 3 or stopping the thermal energy supply.

An advantage of constituting the means for switching 3 with the NTC thermistor elements 311 and 312 is that since the NTC thermistor elements 311 and 312 operate as high resistors at normal temperature to limit the current flowing into the thin film element 1 it is not necessary to supply thermal energy from the outside for electrostatic breakdown prevention. This means that in various situations in which an electrostatic charge may occur such as during the manufacturing and assembly processes, during the process of transporting the product from the manufacturer to the user, during the acceptance inspection conducted at the user and during the assembly into a magnetic disk device, any electrical charge that may cause electrostatic breakdown and the change in the characteristics that may result can be prevented without having to provide thermal energy from the outside.

Figure 5:
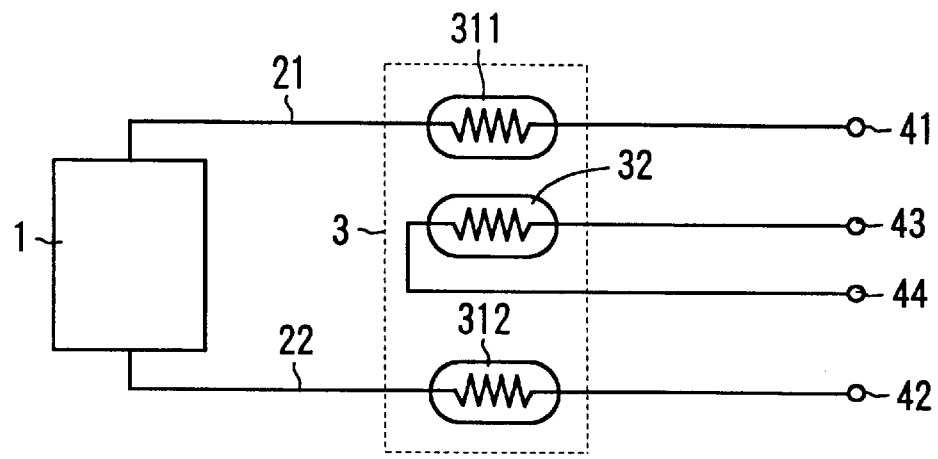
FIG. 5 illustrates yet another embodiment of the thin film device according to the present invention.

FIG. 5 illustrates yet another embodiment of the thin film device according to the present invention. In the figure, the same reference numbers are assigned to components identical to those illustrated in FIGS. 1 to 4. In this embodiment, the means for switching 3 is constituted of NTC thermistor elements 311 and 312 and a heating PTC thermistor element 32 provided to supply thermal energy to the NTC thermistor elements 311 and 312. The heating PTC thermistor element 32 is driven by an electrical signal provided from the outside through terminals 43 and 44.

Figure 6:
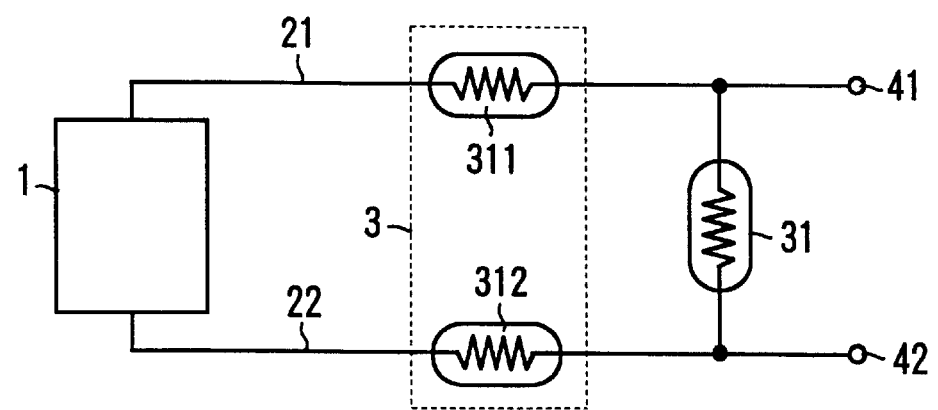
FIG. 6 illustrates yet another embodiment of the thin film device according to the present invention.

FIG. 6 illustrates yet another embodiment of the thin film device according to the present invention. In the figure, the same reference numbers are assigned to components identical to those in FIGS. 1 to 5. In this embodiment, the means for switching 3 is constituted of NTC thermistor elements 311 and 312 and a PTC thermistor element 31. The NTC thermistor elements 311 and 312 are respectively connected in series with the lead conductors 21 and 22. The PTC thermistor element 31 is connected between the output terminals 41 and 42.

In a situation in which it is necessary to prevent electrostatic breakdown, the NTC thermistor elements 311 and 312 and the PTC thermistor element 31 are kept at normal temperature. As long as this state is sustained, even if an electrostatic charge in the body of a worker is introduced via the output terminals 41 and 42 during a manufacturing or assembly process, the current limiting effect achieved by the NTC thermistor elements 311 and 312 and the shorting effect achieved by the PTC thermistor element 31 ensure that no excess current flows into the thin film element 1. As a result, any electrical charge that may cause electrostatic breakdown and the change in the characteristics that may result can be prevented.

Furthermore, in the embodiment which adopts a circuit structure achieved by connecting in series the NTC thermistor elements 311 and 312 which operate as high resistors at normal temperature to the thin film element 1 and connecting this serial circuit to the PTC thermistor element 31 in parallel, an electrostatic charge that has been introduced is made to flow even more readily to the PTC thermistor element 31 rather than to the serial circuit constituted of the NTC thermistor elements 311 and 312 and the thin film element 1. Thus, electrostatic breakdown of the thin film element 1 and change in its characteristics can be prevented with an even higher degree of reliability.

Thermal energy should be supplied to the NTC thermistor elements 311 and 312 and the PTC thermistor element 31 when providing a signal to the thin film element 1 or taking out a signal from the thin film element 1 for characteristics measurement work or the like. The thermal energy will reduce the resistance value of the NTC thermistor elements 311 and 312 and rapidly increase the resistance value of the PTC thermistor element 31 to achieve an open state so that a normal signal transmission line is constituted between the thin film element 1 and the output terminals 41 and 42.

Figure 7:
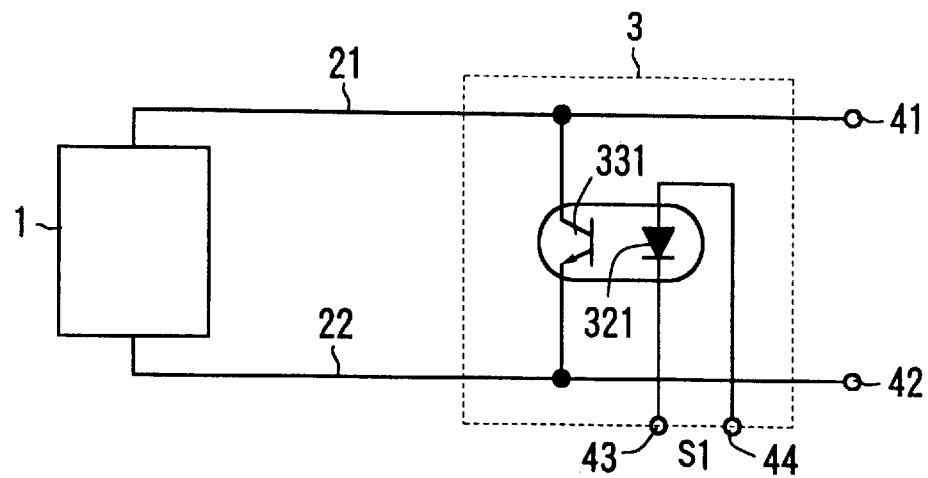
FIG. 7 illustrates yet another embodiment of the thin film device according to the present invention

FIG. 7 illustrates yet another embodiment of the thin film device according to the present invention. In the figure, the same reference numbers are assigned to components identical to those illustrated in FIGS. 1 to 6. In this embodiment, the means for switching 3 is constituted of a phototransistor 331 and a light emitting element 321. The phototransistor 331 is connected between the lead conductors 21 and 22. In the embodiment, by providing an electrical signal S1 to the terminals 43 and 44 by stopping the signal supply, the light emitting element 321 is caused to emit light or to stop emitting light to cause the phototransistor 331 to perform a switching operation.

When it is necessary to prevent electrostatic breakdown, the electrical signal S1 is provided to the terminals 43 and 44 to cause the light emitting element 321 to emit light so that the phototransistor 331 is sustained in an on state. As long as this state is sustained, even if an electrostatic charge in the body of a worker is introduced via the output terminals 41 and 42 during a manufacturing or assembly process, no excess current will flow into the thin film element 1. As a result, any electrostatic breakdown of the thin film element 1 and change in its characteristics can be prevented.

The light emitting element 321 is caused to stop emitting light by stopping the supply of the electrical signal S1 to the terminals 43 and 44 when providing the thin film element 1 with a signal or taking out a signal from the thin film element 1 for characteristics measurement work or the like. Since this will turn of the phototransistor 331, a normal signal transmission line is constituted between the thin film element 1 and the output terminals 41 and 42. The thin film device according to the present invention may adopt a structure provided only with a phototransistor with the emission and extinction of light effected by an external light source.

Figure 8:
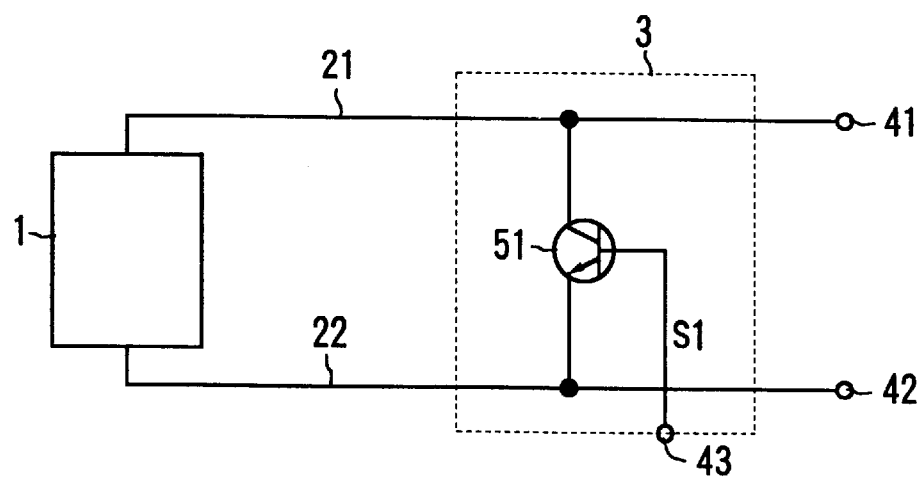
FIG. 8 illustrates yet another embodiment of the thin film device according to the present invention.

FIG. 8 illustrates yet another embodiment of the thin film device according to the present invention. In the figure, the same reference numbers are assigned to components identical to those illustrated in FIGS. 1 to 7. In this embodiment, the means for switching 3 is constituted of a three-terminal switching element 51. The three-terminal switching element 51, which may be 5 constituted of a bipolar transistor, a field effect transistor or the like, is connected between the lead conductors 21 and 22. The embodiment illustrated in FIG. 8, in which the three-terminal switching element 51 is controlled through a method identical to the method through which the phototransistor illustrated in FIG. 7 is controlled, achieves almost identical advantages to those achieved by the embodiment in FIG. 7.

Figure 9:
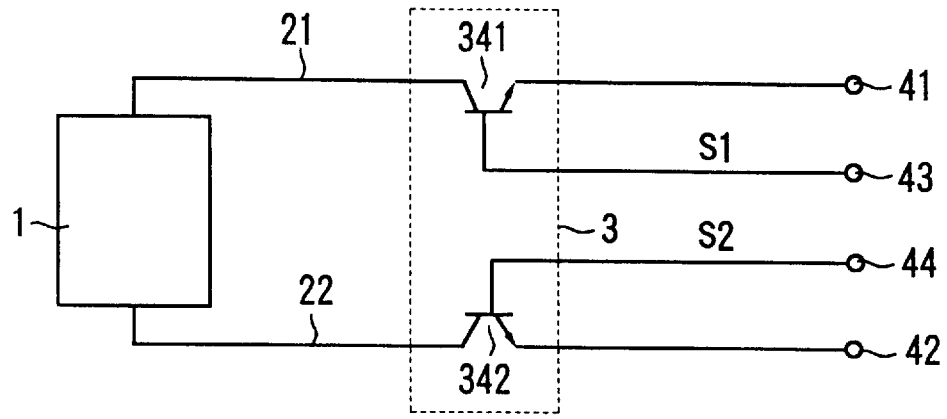
FIG. 9 illustrates yet another embodiment of the thin film device according to the present invention.

FIG. 9 illustrates yet another embodiment of the thin film device according to the present invention. In the figure, the same reference numbers are assigned to components identical to those illustrated in FIGS. 1 to 8. In this embodiment, the means for switching 3 is constituted of semiconductor switches 341 and 342. The semiconductor switches 341 and 342 in the figure are each constituted of a three-terminal switching element, and are respectively controlled by electrical signals S1 and S2 provided to the terminals 43 and 44 connected to control electrodes.

When it is necessary to prevent electrostatic breakdown, the semiconductor switches (three-terminal switching elements) 341 and 342 are sustained in an off state. As long as this state is sustained, even if an electrostatic charge in the body of a worker is introduced via the output terminals 41 and 42 during a manufacturing or assembly process, no excess current will flow into the thin film element 1. As a result, any electrostatic breakdown of the thin film element 1 and change in its characteristics can be prevented.

Continuity is achieved for the semiconductor switches (three-terminal switching elements) 341 and 342 by providing the control signals S1 and S2 to the control electrodes of the semiconductor switches (three-terminal switching elements) 341 and 342 when providing the thin film element 1 with a signal or taking out a signal from the thin film element 1 for characteristics measurement work or the like, so that a normal signal transmission line is constituted between the thin film element 1 and the output terminals 41 and 42.

Figure 10:
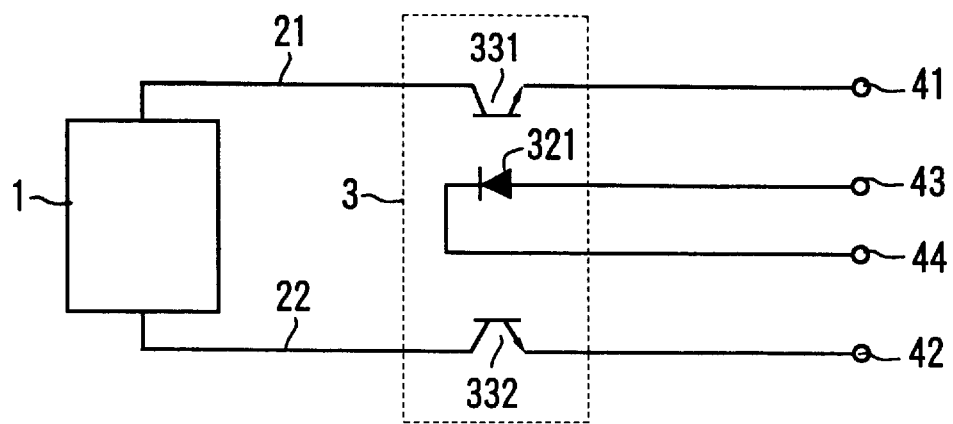
FIG. 10 illustrates yet another embodiment of the thin film device according to the present invention.

FIG. 10 illustrates yet another embodiment of the thin film device according to the present invention. In the figure, the same reference numbers are assigned to components identical to those illustrated in FIGS. 1 to 9. In this embodiment, the means for switching 3 is constituted of phototransistors 331 and 332 and a light emitting element 321. In the embodiment, the light emitting element 321 is caused to emit light or stop emitting light by electrical signals provided to the terminals 43 and 44 to cause the phototransistor 331 and 332 to perform a switching operation.

The timing with which the phototransistors 331 and 332 are controlled is the same as the timing with which the semiconductor switches (three-terminal switching elements) in FIG. 9 are controlled, and the embodiment achieves advantages almost identical to those achieved by the embodiment illustrated in FIG. 9.

Figure 11:
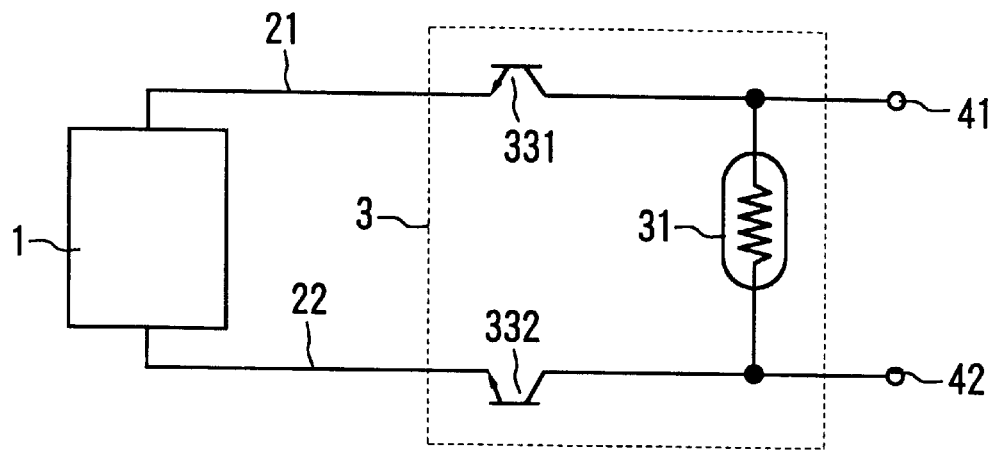
FIG. 11 illustrates yet another embodiment of the thin film device according to the present invention.

FIG. 11 illustrates yet another embodiment of the thin film device according to the present invention. In the figure, the same reference numbers are assigned to components identical to those illustrated in FIGS. 1 to 10. In this embodiment, the means for switching 3 is constituted of phototransistors 331 and 332 and a PTC thermistor element 31. The phototransistors 331 and 332 are respectively connected in series with the lead conductors 21 and 22. The PTC thermistor element 31 is connected between the terminals 41 and 42. Although not shown, a light emitting element that drives the phototransistors 331 and 332 is provided.

When it is necessary to prevent electrostatic breakdown, the phototransistors 331 and 332 are set in an off state and the PTC thermistor element 31 is kept at normal temperature. As long as this state is sustained, even if an electrostatic charge in the body of a worker is introduced via the output terminals 41 and 42 during a manufacturing or assembly process, no excess current will flow into the thin film element 1 since the phototransistors 331 and 332 are in an off state and the PTC thermistor element 31 is in a shorted state. Thus, any electrostatic breakdown of the thin film element 1 and change in its characteristics can be prevented.

When providing the thin film element 1 with a signal or taking out a signal from the thin film element 1 for characteristics measurement work or the like, the phototransistors 331 and 332 are turned on and thermal energy is supplied to the PTC thermistor element 31, to achieve continuity for the phototransistors 331 and 332 and rapidly increase the resistance value of the PTC thermistor element 31 until the PTC thermistor element 31 enters an open state, resulting in a normal signal transmission line constituted between the thin film element 1 and the output terminals 41 and 42.

Figure 12:
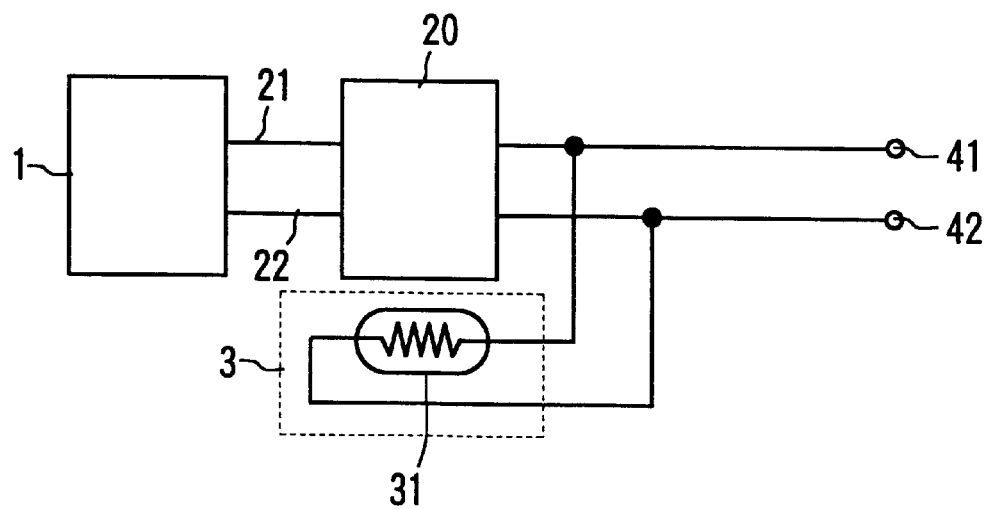
FIG. 12 illustrates yet another embodiment of the thin film device according to the present invention.

FIG. 12 illustrates yet another embodiment of the thin film device according to the present invention. In the figure, the same reference numbers are assigned to components identical to those illustrated in FIGS. 1 to 11. This embodiment includes asignal processing circuit 20 which is connected to the thin film element 1.

The embodiment illustrated in FIG. 12 is characterized in that the means for switching 3 is caused to perform a switching operation by the thermal energy generated when the signal processing circuit 20 operates. In this embodiment, the means for switching 3 is constituted of a PTC thermistor element 31 which is connected between the terminals 41 and 42.

When it is necessary to prevent electrostatic breakdown, the PTC thermistor element 31 is kept at normal temperature. As long as this state is sustained, even if an electrostatic charge in the body of a worker is introduced via the output terminals 41 and 42 during a manufacturing or assembly process, no excess current will flow into the thin film element 1 since the PTC thermistor element 31 is in a shorted state. Consequently, any electrostatic breakdown of the thin film element 1 and change in its characteristics can be prevented.

When providing the thin film element 1 with a signal or taking out a signal from the thin film element 1 for characteristics measurement work or the like, the signal processing circuit 20 operates and generates heat. Through this heat generating operation, the PTC thermistor element 31 is heated and the resistance value of the PTC thermistor element 31 increases rapidly until the PTC thermistor element 31 enters an open state, resulting in a normal signal transmission line being constituted between the thin film element 1 at the output terminals 41 and 42.

During an early stage of the characteristics measurement work, the PTC thermistor element 31 is heated by an external heat source which is provided separately from the signal processing circuit 20 so that the signal processing circuit 20 can start operation. Then, after the signal processing circuit 20 starts its operation and the temperature of the heat generated rises to the level that is high enough to cause the PTC thermistor element 31 to operate in the high resistance area, the heat generated by the signal processing circuit 20 may be exclusively utilized.

The PTC thermistor element 31 is provided at a stage to the rear of the signal processing circuit 20. Consequently, in this embodiment, electrostatic breakdown of the signal processing circuit 20 as well as electrostatic breakdown of the thin film element 1 can be prevented.

Figure 13:
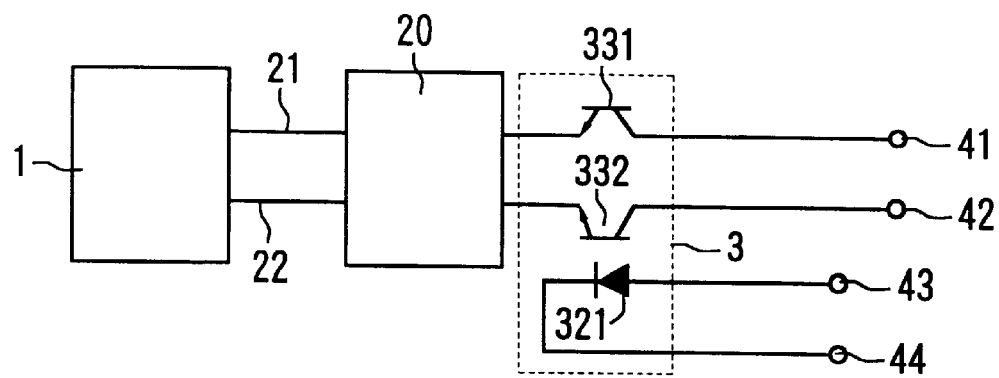
FIG. 13 illustrates yet another embodiment of the thin film device according to the present invention.

FIG. 13 illustrates yet another embodiment of the thin film device according to the present invention. In the figure, the same reference numbers are assigned to components identical to those illustrated in FIGS. 1 to 12. This embodiment, too, includes a signal processing circuit 20. The means for switching 3, which includes the phototransistors 331 and 332 and the light emitting element 321, is provided at a stage to the rear of the signal processing circuit 20. Thus, in the embodiment, electrostatic breakdown of the signal processing circuit 20 as well as electrostatic breakdown of the thin film element 1 can be prevented.

Although not shown, the means for switching 3 may be constituted of a mechanical means for switching 3. The mechanical means for switching 3 may be the type having a mechanical contact point that is manually operated or the type having a mechanical contact point that is opened/closed with a signal such as electricity, magnetism, heat, light or the like. The latter type includes, for instance, a relay employing a coil, a lead relay and a thermal relay.

According to the present invention, the thin film element 1 may be constituted of a semiconductor integrated circuit element or a magnetoresistive film. When the thin film element 1 is constituted of a magnetoresistive film, the present invention may be adopted in a magnetoresistive film having a multi-layer film structure to achieve an outstanding advantage. A typical example of a magnetoresistive film having a multi-layer film structure is a magnetoresistive film having a spin valve film structure. Such a magnetoresistive film adopting a spin valve film structure is employed as a reproduction element in a thin film magnetic head. Next, an example in which the present invention is adopted in a thin film magnetic head device is explained.

Figure 14:
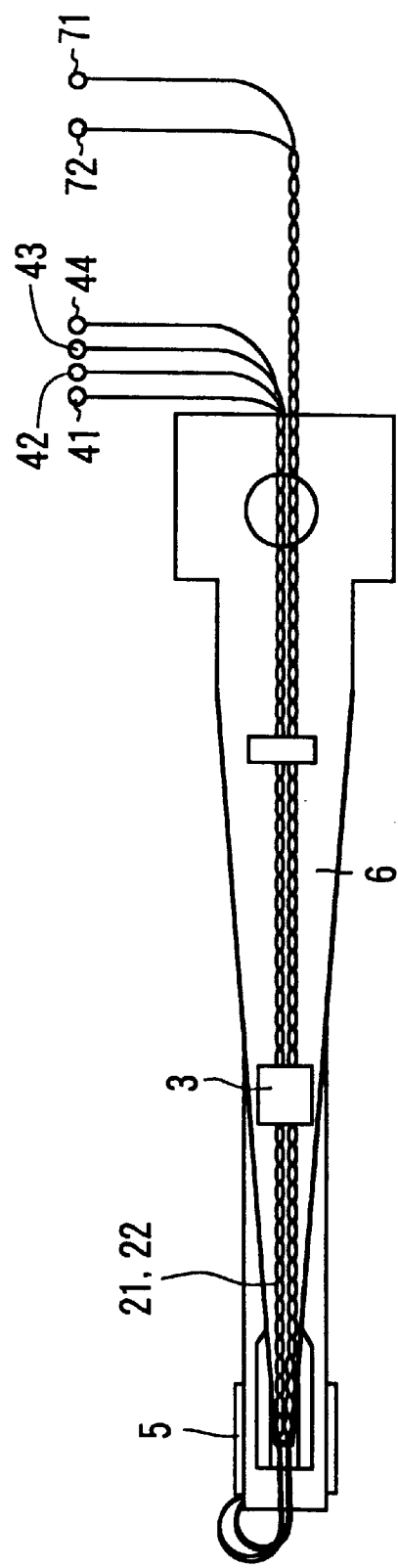
FIG. 14 is a top view of the magnetic head device according to the present invention.

FIG. 14 is a top view of the magnetic head device according to the present invention. The magnetic head device according to the present invention includes a thin film magnetic head 5, a head support device 6, two sets of lead conductors (21 and 22) and (71 and 72) and a means for switching 3. The circuit for achieving electrostatic breakdown prevention which is constituted of the means for switching 3 may assume any of the structures adopted in the embodiments illustrated in FIGS. 1 to 13.

In the embodiment illustrated in FIG. 14, the means for switching 3 is mounted on one surface of the head support device 6. The means for switching 3 is connected between the lead conductors 21 and 22, of the lead conductors (21 and 22) and (71 and 72). The means for switching 3 may be mounted on the head support device 6 by using a circuit board or a flexible wiring board, or it may be directly mounted.

Figure 15:
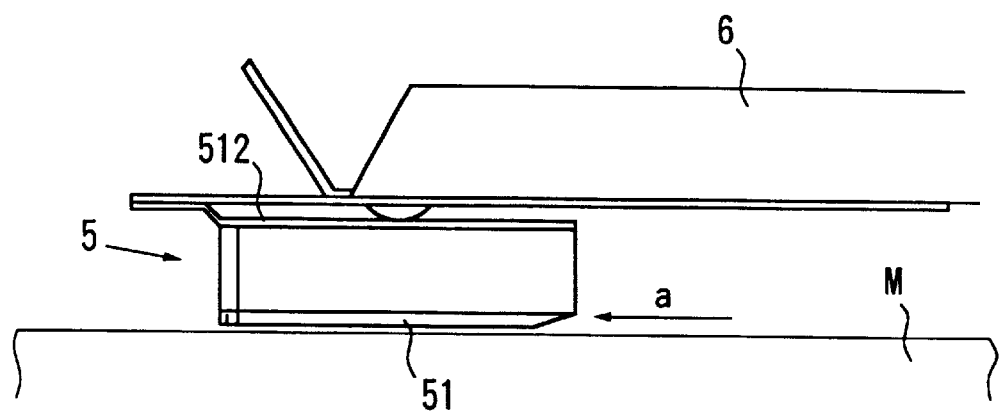
FIG. 15 is an enlarged frontal view of the magnetic head mounting portion of the magnetic head device illustrated in FIG. 14.
Figure 16:
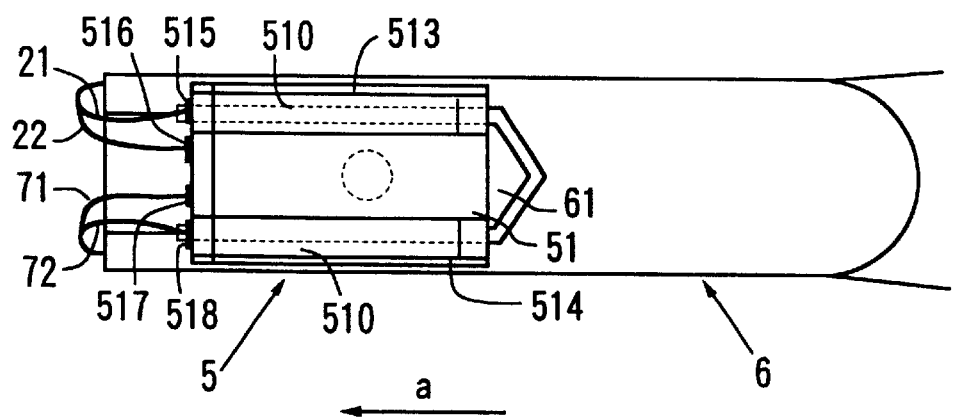
FIG. 16 is an enlarged bottom view of the magnetic head mounting portion of the magnetic head device illustrated in FIG. 14.

FIG. 15 is an enlarged front view of the magnetic head mounting portion of the magnetic head device illustrated in FIG. 14, and FIG. 16 is an enlarged bottom view of the magnetic head mounting portion of the magnetic head device illustrated in FIG. 14.

As shown in FIGS. 15 and 16, the thin film magnetic head 5 is provided with a slider 51. One surface of the slider 51 constitutes a surface facing opposite the medium M, with the opposite surface constituting a supporting surface 512. The surface facing opposite the medium M of the slider 51 may be provided with 1 to 3 rail portions or it may be formed as a flat surface with no rail portions. In addition, various geometric patterns may be added to the surface facing opposite the medium M in order to achieve an improvement in the flying characteristics. The present invention may be adopted with any of those types of sliders. The portion of the surface facing opposite the medium M that projects out the furthest constitutes an air bearing surface having a high degree of surface smoothness. The slider 51 in the figure is provided with two rail portions 513 and 514 at the surface facing opposite the medium M, and the surfaces of the rail portions 513 and 514 are used as air bearing surfaces 510.

Thin film elements 1 and 52 are located at a side surface of the slider 51 (see FIG. 17) and are provided with bumps 515, 516, 517 and 518 that emerge on the outside of the slider 51. The thin film elements 1 and 52 are located at the outflow end viewed from the direction in which the medium runs (the direction of air outflow) indicated by the arrow a. The thin film elements 1 and 52 are manufactured through a process similar to the process through which ICs are manufactured.

Figure 17:
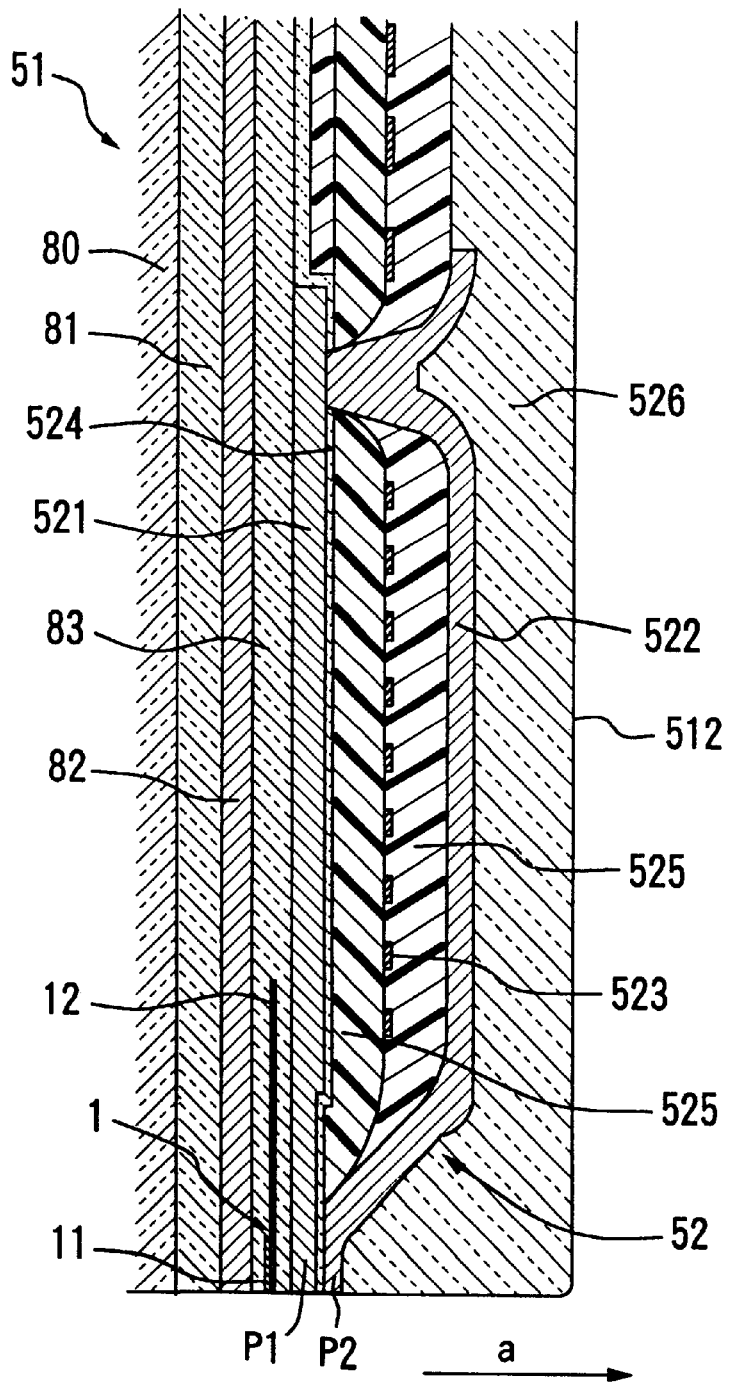
FIG. 17 is an enlarged sectional view illustrating the thin film element of the thin film magnetic head

FIG. 17 is a sectional view that illustrates in an enlargement the thin film elements 1 and 52 in the thin film magnetic head 5. Of the thin film elements 1 and 52, the thin film element 1 is a reproduction element constituted of a magnetoresistive film and the thin film element 52 is an inductive recording element. Hereafter, the thin film element 1 achieved by using the magnetoresistive film is referred to as an MR element.

Figure 18:
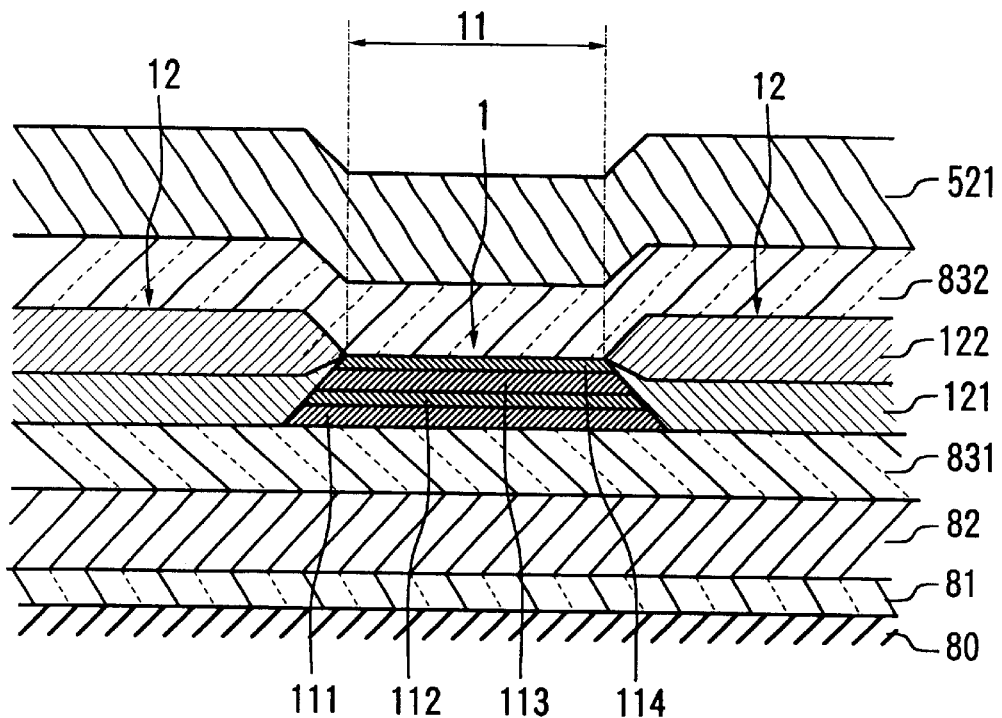
FIG. 18 is an enlarged sectional view illustrating the structure of the MR element included in the thin film magnetic head in further detail

FIG. 18 is an enlarged sectional view illustrating the structure of the MR element 1 included in the thin film magnetic head in further detail. On a base insulating film 81 which is laminated onto a base body 80 constituting the slider 51, a first magnetic shield film 82, a first insulating film 831, the MR element 1, a second insulating film 832 and a second magnetic shield film (first magnetic film) 521 are sequentially laminated.

While a central active area 11 constituting the MR element 1 may be constituted by using a magnetic anisotropic magnetoresistive film, it is more desirable to constitute it with a spin valve film. The central active area 11 in the figure is constituted of a spin valve film. This spin valve film includes a magnetic field response film (first ferromagnetic film) 111, a non-magnetic film 112, a magnetization fixed film (second ferromagnetic film) 113 and an antiferromagnetic film 114. It goes without saying that another film structure may be adopted other than this particular film structure for the spin valve film.

The central active area 11 constituted of the spin valve film is formed to have a track width of, for instance, 2.5 μm, with lead conductors 12 provided at the two ends thereof. The lead conductors 12 are each provided with a Co—Pt alloy film 121 and an electrode film 122. The Co—Pt alloy film 121 is provided to control the magnetic domain of the magnetic field response film 111 of the spin valve film by applying a longitudinal bias magnetic field to the spin valve film.

More specifically, the spin valve film adopts the following film structure. First, the magnetic field response film 111 is constituted of an NiFe film having a film thickness of approximately 0.1 μm. Under the magnetic field response film 111, a base film constituted of a Ta film having a film thickness of approximately 0.05 μm is formed. The non-magnetic film 112 is constituted of a Cu film having a film thickness of approximately 0.025 μm. The magnetization fixed film 113 is constituted of an NiFe film having a film thickness of approximately 0.05 μm. The antiferromagnetic film 114 is constituted of an FeMn film having a film thickness of approximately 0.1 μm and is provided with a protective film constituted of a Ta film having a film thickness of approximately 0.05 μm. However, this film structure and the numerical values of the film thicknesses represent an example only, which does not restrict the present invention in any way whatsoever and other film structures may be adopted instead.

As explained earlier, the spin valve film adopting a multi-layer thin film structure has an extremely small current carrying capacity. Because of this, if an electrostatic charge in the body of a worker handling the magnetic head assembly is introduced into the magnetic head assembly during a manufacturing or assembly process, an excess current will flow into the spin valve film, which may, in turn, readily cause electrostatic breakdown.

In addition, the magnetoresistance effect of the spin valve film is determined by the rotating angle of the direction of the magnetization of the magnetic field response film (free layer) relative to the direction of the fixed magnetization of the magnetization fixed film (pinned layer) 113 in contact with the antiferromagnetic layer 114. If an electrostatic charge is introduced into the spin valve film adopting such a structure, the direction of the fixed magnetization of the magnetization fixed film (pinned layer) 113 will be caused to change by a magnetic field, heat and the like occurring depending upon the direction in which the electric charge travels or occurring due to the traveling charge. If the direction of the fixed magnetization of the magnetization fixed film (pinned layer) 113 changes, the magnetoresistance effect will change and, as a result, specific reproduction characteristics cannot be achieved.

The thin film element 52 constituting the recording element is provided with a first magnetic film 521 which also functions as the second shield film, a second magnetic film 522, a coil film 523, a gap film 524 constituted of alumina or the like, an insulating film 525 constituted of an organic resin, a protective film 526 and the like, as illustrated in FIG. 17. The front ends of the first magnetic film 521 and the second magnetic film 522 form pole tips P1 and P2 which face opposite each other over the gap film 524 having an extremely small thickness, and a write operation is performed at the pole tips P1 and P2.

The yokes of the first magnetic film 521 and the second magnetic film 522 are linked with each other to complete a magnetic circuit at the back gap portion which is located on the opposite side from the pole tips P1 and P2. The coil film 523 is formed winding around the linked portion of the yokes in a coil on the insulating film 525. The two ends of the coil film 523 are electrically continuous with the bumps 517 and 518 (see FIGS. 15 and 16).

Next, the head support device 6 having one end in the direction of the length constituted as a fixed end and the other end constituted as a free end, as illustrated in FIGS. 14, 15 and 16, is provided with a flexible supporting portion 61 at the free end with the flexible supporting portion 61 mounted at the supporting surface 512 of the slider 51. The head support device 6 supports the thin film magnetic head in such a manner that the thin film magnetic head 5 can follow surface fluctuations of the magnetic disk (not shown). Various types of head support devices have been proposed and put into practical use in the prior art to constitute such a head support device. The flexible supporting portion 61 of the head support device 6 in the figures constitutes a gimbal that allows a rolling motion around a first axis which is assumed in the lengthwise direction and a pitching motion around a second axis which intersects the first axis orthogonally, and the supporting surface 512 of the slider 51 constituting the thin film magnetic head 5 is linked to its lower surface by a means such as bonding.

Among the lead conductors (21 and 22) and (71 and 72), the lead conductors 21 and 22 are provided for the MR element 1 and the lead conductors 71 and 72 are provided for the thin film element 52 which is to constitute a recording element. The lead conductors 21 and 22 are intertwined. Such lead conductors 21 and 22 are normally referred to as twisted pair cables. The lead conductors 21 and 22 are each connected to the MR element 1 at one end. More specifically, the lead conductors 21 and 22 are respectively connected to the bumps 515 and 516 (see FIGS. 15 and 16) and are made to be electrically continuous with the end passive areas 121 and 122 of the MR element 1 illustrated in FIG. 18. The means for switching 3 which is mounted at the head support device 6 is connected between the lead conductors 21 and 22 in the middle area in the direction of the length.

In the embodiment, the lead conductors 71 and 72, too, are constituted of twisted pair cables. The lead conductors 71 and 72 are respectively connected to the bumps 517 and 518 (see FIGS. 15 and 16) at one end, to be connected to the coil film 523 of the thin film element 52 constituting the recording element (see FIG. 17).

Figure 19:
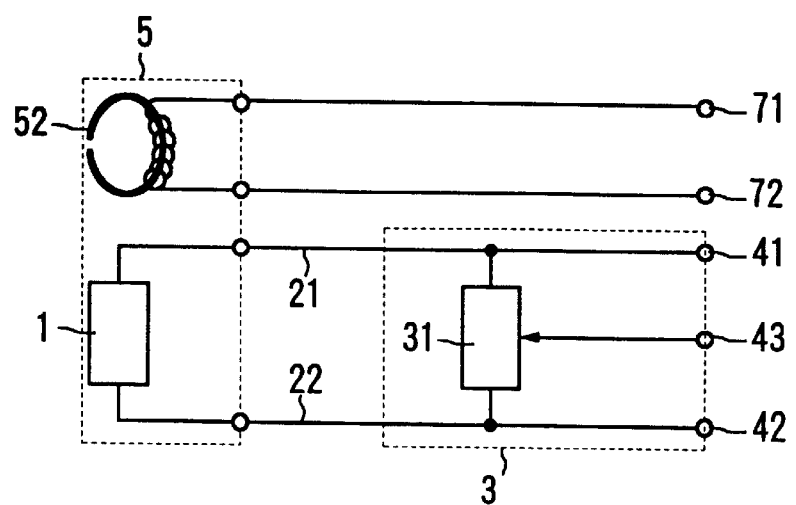
FIG. 19 is the electrical connection diagram of the magnetic head device illustrated in FIGS. 14 to 18

FIG. 19 is an electrical connection diagram of the magnetic head device illustrated in FIGS. 14 to 18. As shown in the figure, the MR element 1 constituted of the spin valve film is led to the output terminals 41 and 42 via the lead conductors 21 and 22, with a means for switching 3 connected between the lead conductors 21 and 22. Thus, even if an electrostatic charge in the body of a worker is introduced via the output terminals 41 and 42 during a manufacturing or assembly process, it is shorted by the means for switching 3 and, consequently, it never flows into the MR element 1. As a result, any electrostatic breakdown of the MR element 1 and change in its characteristics can be prevented.

During the process of transporting the product from the manufacsturer to the user, during the acceptance inspection performed at the user, during the assembly into the magnetic disk device and the like, too, any electrical charge, resulting electrostatic breakdown and change in characteristics can be prevented as long as the means for switching 3 sustains a closed state.

When providing the MR element 1 with a signal or when taking a signal out from the MR element 1 for the characteristics measurement work or the like, energy S1 that achieves an open state for the means for switching 3 should be supplied to the means for switching 3, since this will constitute a normal signal transmission line between the MR element 1 and the output terminals 41 and 42 to accommodate the characteristics measurement work.

While, when the spin valve film which only achieves an extremely small current carrying capacity is employed to constitute the MR element 1, an excess current will flow into the spin valve film to readily cause electrostatic breakdown if an electrostatic charge from the body of a worker handling the magnetic head assembly is applied to the magnetic head assembly during a manufacturing or assembly process, electrostatic breakdown of the spin valve film can be prevented in the embodiment adopting the present invention as the illustrations of the embodiment demonstrate.

In addition, while, if an electrostatic charge is introduced into the spin valve film, the direction of the fixed magnetization of the magnetization fixed film (pinned layer) 113 is caused to change depending upon the direction in which the charge travels and by a magnetic field, heat or the like occurring due to the traveling charge, which, in turn, changes the magnetoresistance effect to such a degree that specific reproduction characteristics cannot be achieved, this problem, too, is eliminated in the embodiment adopting the present invention.

Figure 20:
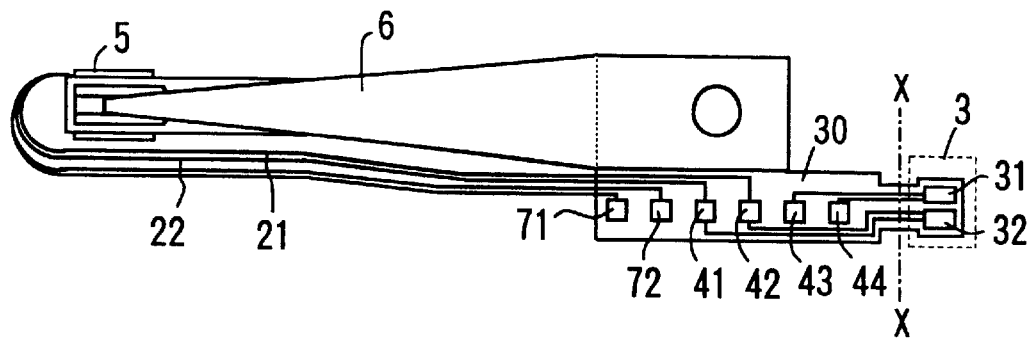
FIG. 20 is a top view illustrating another embodiment of the magnetic head device according to the present invention.
Figure 21:
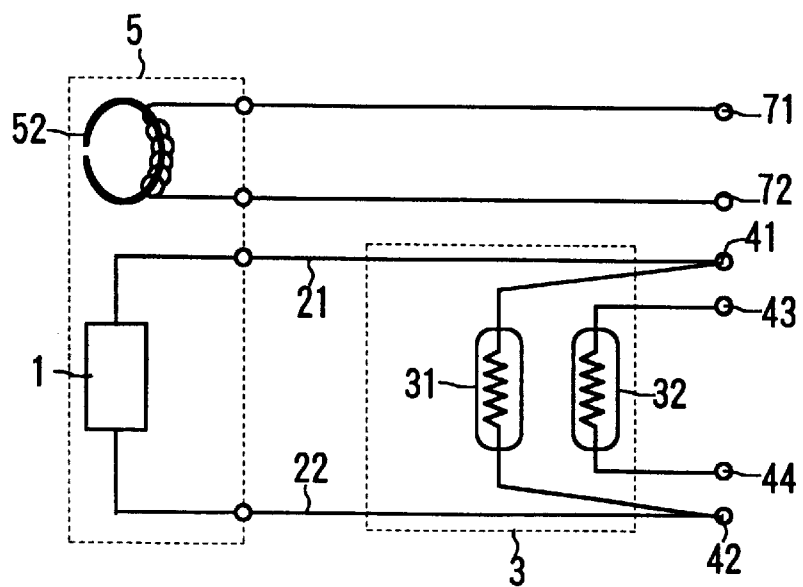
FIG. 21 is an electrical circuit diagram of the magnetic head device illustrated in FIG. 20.

Next, other embodiments of the thin film magnetic head device are explained in reference to FIGS. 20 to 36. FIG. 20 is a top view illustrating another embodiment of the magnetic head device according to the present invention and FIG. 21 is an electrical circuit diagram of the magnetic head device in FIG. 20. The embodiment illustrated in FIGS. 20 and 21 provides a magnetic head device which adopts the thin film magnetic device shown in FIG. 3. A board 30 is mounted at a side of the head support device 6, with the PTC thermistor element 31 constituting the means for switching 3 for achieving electrostatic breakdown prevention and the heating PTC thermistor element 32 mounted on the board 30. At the board 30, the terminals 71 and 72 for the recording element 52 (see FIGS. 17 and 21), the terminals 41 and 42 for the MR element 1 and the terminals 43 and 44 for the heating PTC thermistor element 32 are provided. The PTC thermistor element 31 is connected to the terminals 41 and 42. The head support device 6 may be constituted by using, for instance, a flexible wiring board constituted of tab tape or the like.

A function of electrostatic breakdown prevention and characteristics change prevention that is identical to that achieved in the thin film device illustrated in FIG. 3 is achieved in the MR element 1 constituted of a thin film device and the handling for characteristics measurement work should be the same as that required for the thin film device in FIG. 3. The board 30 is cut across cutting line X—X immediately before the thin film magnetic head device is mounted into a magnetic recording/reproduction apparatus or after it is mounted into the magnetic recording/reproduction apparatus, to separate the PTC thermistor elements 31 and 32 from the circuit constituted of the MR element.

Figure 22:
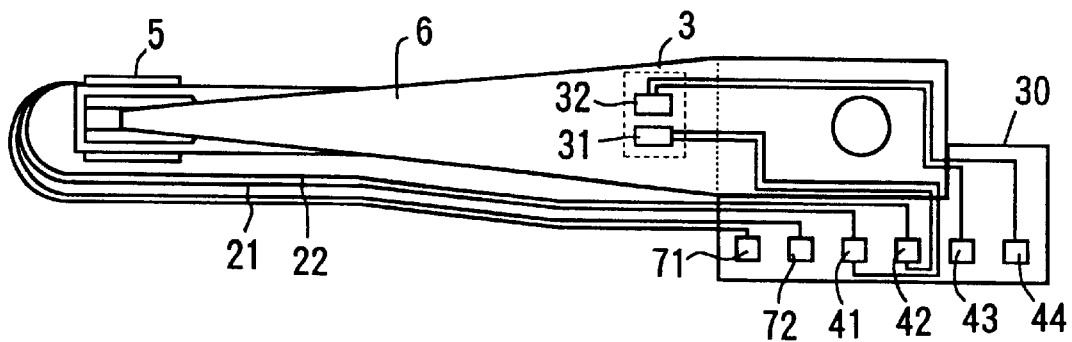
FIG. 22 is a top view illustrating yet another embodiment of the magnetic head device according to the present invention.

FIG. 22 is a top view illustrating yet another embodiment of the magnetic head device according to the present invention. It differs from the embodiment illustrated in FIGS. 20 and 21 in that the PTC thermistor element 31 constituting the means for switching 3 and the heating PTC thermistor element 32 are mounted on the head support device 6. The PTC thermistor elements 31 and 32 can be provided as described above with ease if the head support device is constituted of a flexible wiring board such as a tab tape. Since all the other aspects of this embodiment are identical to those of the embodiment illustrated in FIGS. 20 and 21, apart from this difference, their explanation is omitted.

Figure 23:
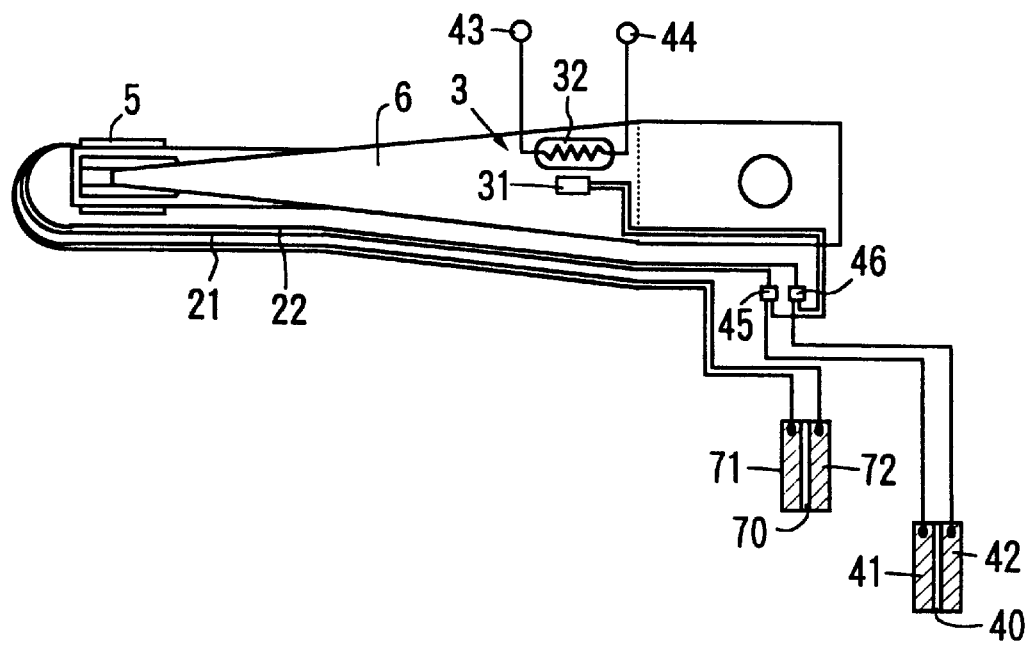
FIG. 23 is a top view illustrating yet another embodiment of the magnetic head device according to the present invention.
Figure 24:
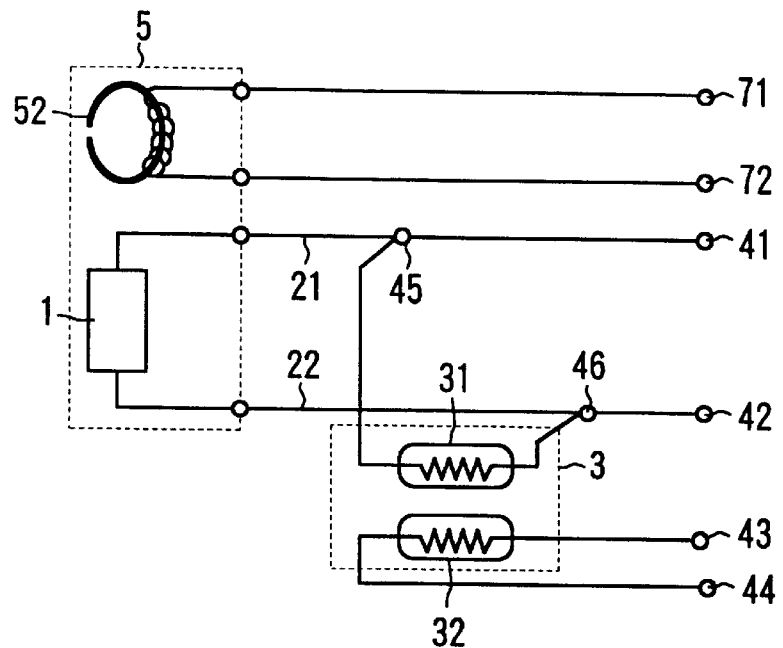
FIG. 24 is an electrical circuit diagram of the magnetic head device illustrated in FIG. 23.

FIG. 23 is a top view illustrating yet another embodiment of the magnetic head device according to the present invention and FIG. 24 is an electrical circuit diagram of the magnetic head device in FIG. 23. The embodiment illustrated in FIGS. 23 and 24, too, provides a magnetic head device adopting the thin film device illustrated in FIG. 3. The PTC thermistor element 31 constituting the means for switching 3 and the heating PTC thermistor element 32 are mounted on the head support device 6. The PTC thermistor element 31 is connected to the lead conductors 21 and 22 that, in turn, are connected to the MR element 1, at terminals 45 and 46.

The terminals 71 and 72 for the recording element 52 (see FIG. 24) are each constituted of a conductor formed at a hard board 70. The terminals 41 and 42 for the MR element 1, too, are each constituted of a conductor formed at a hard board 40. These boards 70 and 40 may be utilized as connectors that are inserted into a measuring device (not shown) for characteristics measurement.

A function of electrostatic breakdown prevention and characteristics change prevention that is identical to that achieved in the thin film device illustrated in FIG. 3 is achieved in the MR element 1 constituted of a thin film element and the handling for characteristics measurement work should be the same as that required for the thin film device in FIG. 3.

Figure 25:
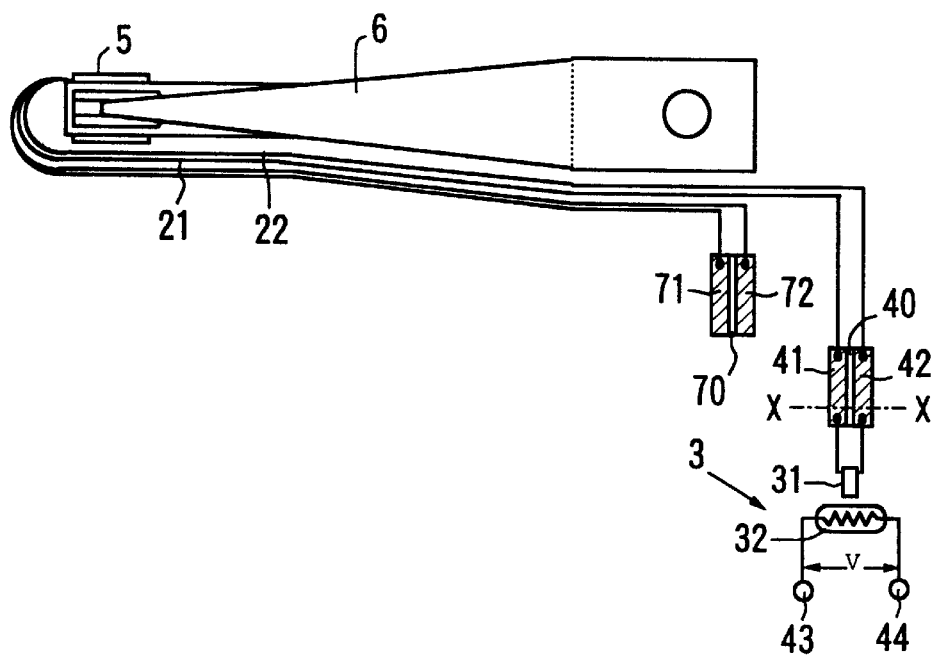
FIG. 25 is a top view illustrating yet another embodiment of the magnetic head device according to the present invention.
Figure 26:
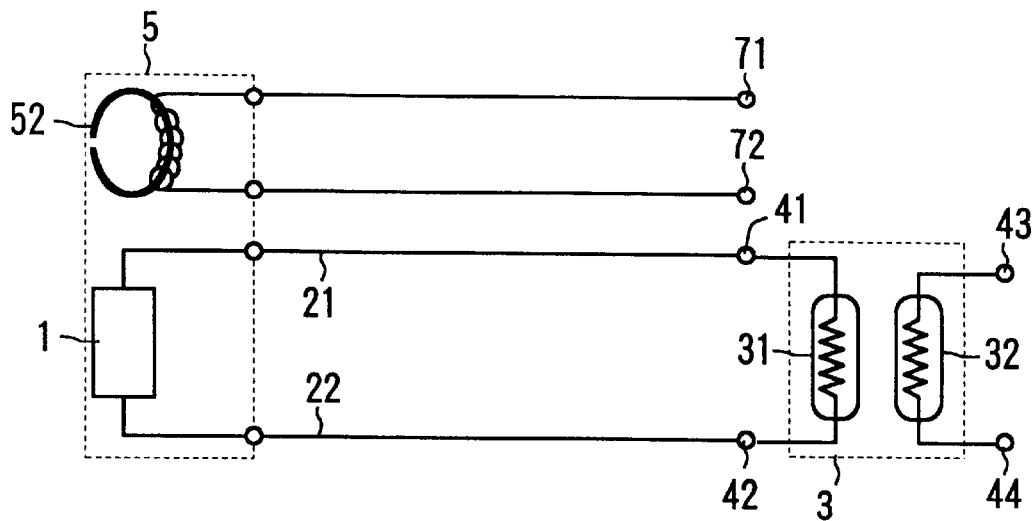
FIG. 26 is an electrical circuit diagram of the magnetic head device illustrated in FIG. 25.

FIG. 25 is a top view illustrating yet another embodiment of the magnetic head device according to the present invention and FIG. 26 is an electrical circuit diagram of the magnetic head device in FIG. 25. The embodiment illustrated in FIGS. 25 and 26, too, provides a magnetic head device adopting the thin film device illustrated in FIG. 3. The terminals 71 and 72 for the recording element 52 (see FIG. 26) and the terminals 41 and 42 for the MR element 1 are respectively formed at the hard boards 70 and 40. These boards 70 and 40 may be utilized as connectors that are inserted into a measuring device (not shown) for characteristics measurement.

The PTC thermistor element 31 constituting the means for switching 3 is connected to the terminals 41 and 42 for the MR element 1 that are formed at the board 40. The heating PTC thermistor element 32 is thermally linked with the PTC thermistor element 31.

A function of electrostatic breakdown prevention and characteristics change prevention for the MR element 1 constituted of a thin film element and the handling for characteristics measurement work should be the same as that required for the thin film device in FIG. 3. The board 40 is cut across cutting line X—X immediately before the magnetic head device is mounted into a magnetic recording/reproduction apparatus or after it is mounted into the magnetic recording/reproduction apparatus, to separate the PTC thermistor element 31 from the board 40.

Figure 27:
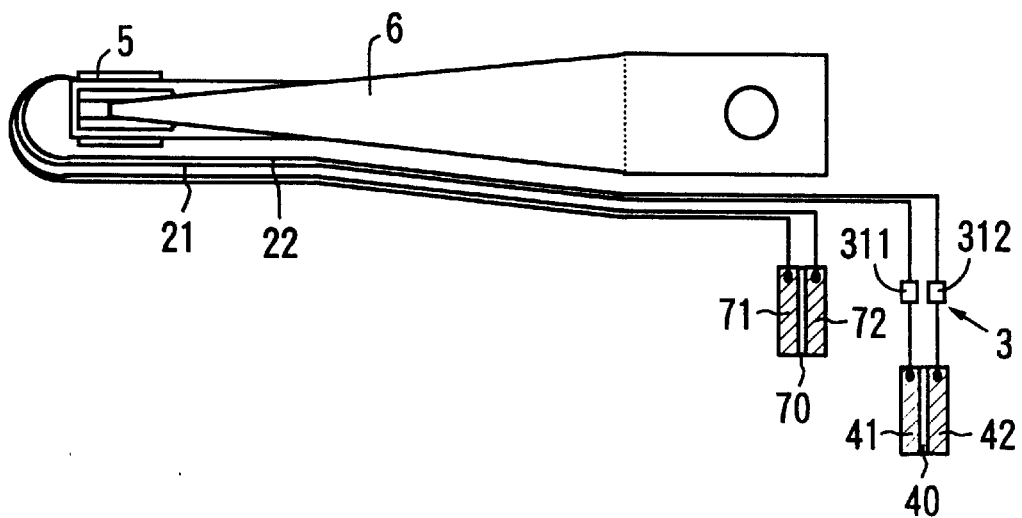
FIG. 27 is a top view illustrating yet another embodiment of the magnetic head device according to the present invention.
Figure 28:
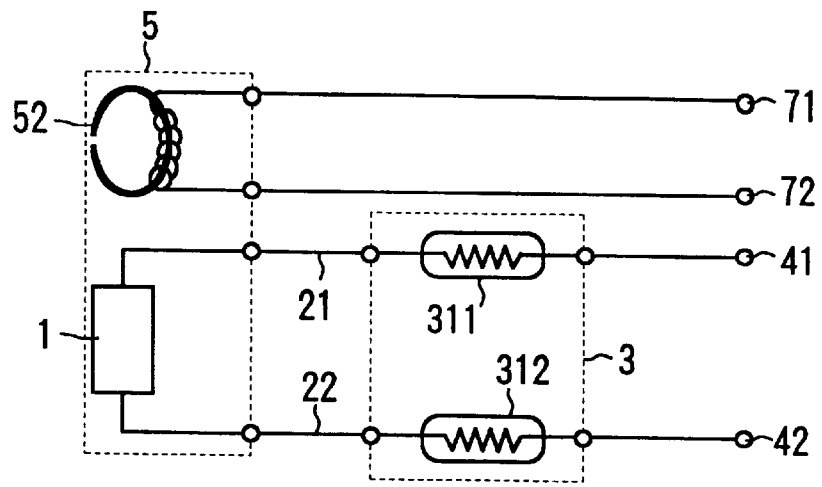
FIG. 28 is an electrical circuit diagram of the magnetic head device illustrated in FIG. 27.

FIG. 27 is a top view illustrating yet another embodiment of the magnetic head device according to the present invention and FIG. 28 is an electrical circuit diagram of the magnetic head device in FIG. 27. The embodiment illustrated in FIGS. 27 and 28 provides a magnetic head device adopting the thin film device illustrated in FIG. 4. The terminals 71 and 72 for the recording element 52 (see FIG. 28) and the terminals 41 and 42 for the MR element 1 are respectively formed at the hard boards 70 and 40. These boards 70 and 40 may be utilized as connectors that are inserted into a measuring device (not shown) for characteristics measurement.

The means for switching 3 is constituted of the NTC thermistor elements 311 and 312. The NTC thermistor elements 311 and 312 are respectively connected in series between the lead conductor 21 and the terminal 41 provided on the board 40 and between the lead conductor 22 and the terminal 42 provided on the board 40. While the embodiment is provided with two NTC thermistors 311 and 312, the means for switching may be provided with one NTC thermistor or two or more NTC thermistors.

The timing with which the means for switching 3 is driven when it is constituted of the NTC thermistor elements 311 and 312 and the advantages achieved by this structure have already been explained in reference to FIG. 4, and through a simple operation of supplying thermal energy to the NTC thermistor elements 311 and 312 from the outside or stopping the thermal energy supply, the function of electrostatic breakdown prevention can be enabled or disabled.

Figure 29:
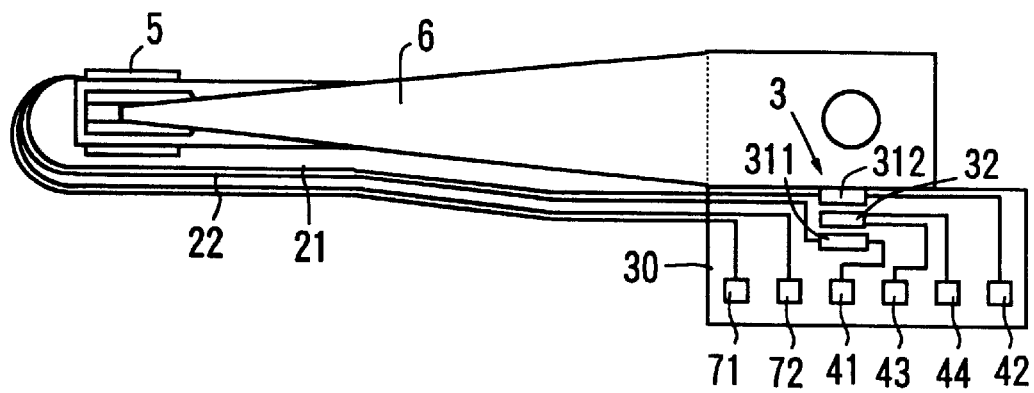
FIG. 29 is a top view illustrating yet another embodiment of the magnetic head device according to the present invention.
Figure 30:
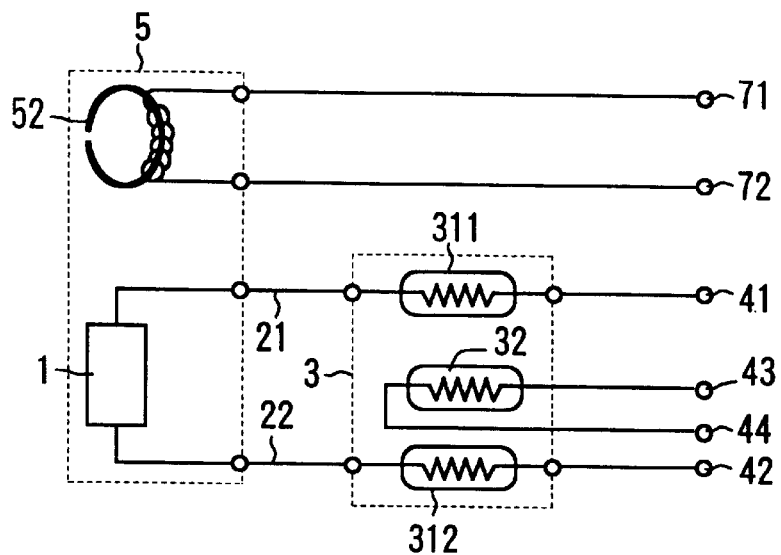
FIG. 30 is an electrical circuit diagram of the magnetic head device illustrated in FIG. 29

FIG. 29 is a top view illustrating yet another embodiment of the magnetic head device according to the present invention and FIG. 30 is an electrical circuit diagram of the magnetic head device in FIG. 29. The embodiment illustrated in FIGS. 29 and 30 provides a magnetic head device adopting the thin film device illustrated in FIG. 5. The board 30 is mounted at a side of the head support device 6, and the NTC thermistor elements 311 and 312 and the heating PTC thermistor element 32 which constitute the means for switching 3 are mounted on the board 30. The terminals 71 and 72 for the recording element 52 (see FIG. 30), the terminals 41 and 42 for the MR element 1 and the terminals 43 and 44 for the heating PTC thermistor element 32 are provided at the board 30.

The means for switching 3 is constituted of NTC thermistor elements 311 and 312. The NTC thermistor elements 311 and 312, which are mounted on the board 30, are respectively connected in series between the lead conductor 21 and the terminal 41 provided on the board 30 and between the lead conductor 22 and the terminal 42 provided on the board 30.

Furthermore, the heating PTC thermistor element 32 is provided on the board 30. The heating PTC thermistor element 32 is thermally linked with the NTC thermistor elements 311 and 312 on the board 30. The heating PTC thermistor element 32 is connected to the terminals 43 and 44 provided on the board 30.

The timing with which the means for switching 3 is driven when it is constituted of NTC thermistor elements 311 and 312 and the advantages achieved by this structure have already been explained in reference to FIG. 5, and through a simple operation of supplying thermal energy to the NTC thermistor elements 311 and 312 from the heating PTC thermistor element 32 or stopping the thermal energy supply, the function of electrostatic breakdown prevention can be enabled or disabled.

Figure 31:
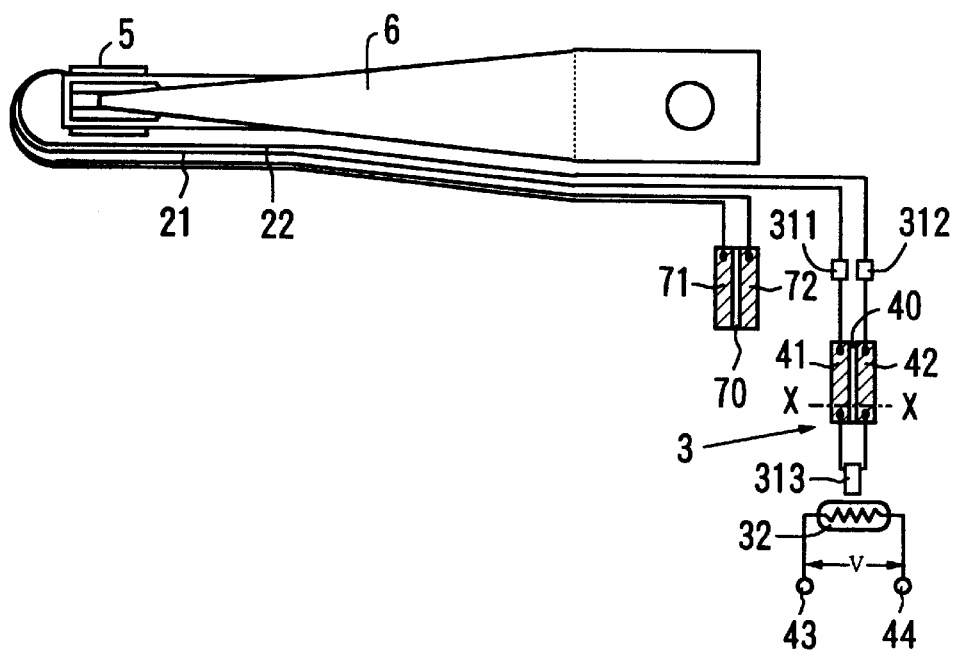
FIG. 31 is a top view illustrating yet another embodiment of the magnetic head device according to the present invention.
Figure 32:
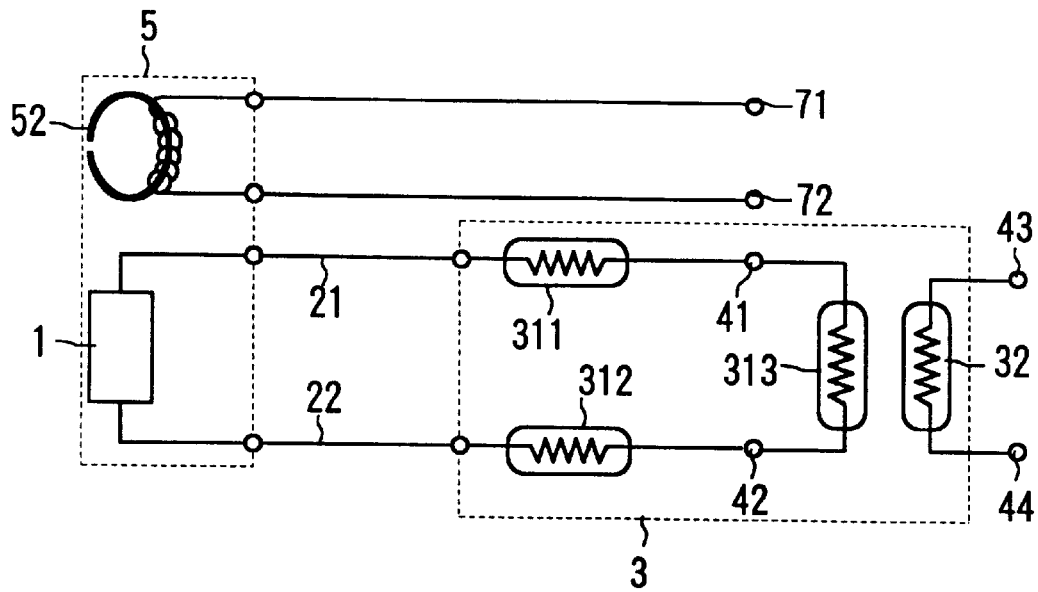
FIG. 32 is an electrical circuit diagram of the magnetic head device illustrated in FIG. 31.

FIG. 31 is a top view illustrating yet another embodiment of the magnetic head device according to the present invention and FIG. 32 is an electrical circuit diagram of the magnetic head device in FIG. 31. The embodiment illustrated in FIGS. 31 and 32 provides a magnetic head device adopting the thin film device illustrated in FIG. 6. The terminals 71 and 72 for the recording element 52 (see FIG. 32) and the terminals 41 and 42 for the MR element 1 are respectively formed at the hard boards 70 and 40. These boards 70 and 40 may be utilized as connectors that are inserted into a measuring device for characteristics measurement.

The means for switching 3 includes the NTC thermistor elements 311 and 312 and the PTC thermistor element 31. The NTC thermistor elements 311 and 312 are respectively connected in series between the lead conductor 21 and the terminal 41 provided on the board 40 and between the lead conductor 22 and the terminal 42 provided on the board 40. The PTC thermistor element 31 is connected with the terminals 41 and 42 formed at the board 40. The heating PTC thermistor element 32 is thermally linked with the PTC thermistor element 31.

The timing with which the NTC thermistor elements 311 and 312 and the PTC thermistor element 31 constituting the means for switching 3 are driven is the same as that in the embodiment explained earlier in reference to FIG. 6, with the means for switching 3 achieving identical advantages to those achieved in the embodiment illustrated in FIG. 6. The board 40 is cut across cutting line X—X immediately before the magnetic head device is mounted into a magnetic recording/reproduction apparatus or after it is mounted into a magnetic recording/reproduction apparatus to separate the PTC thermistor element 31 from the board 40.

Figure 33:
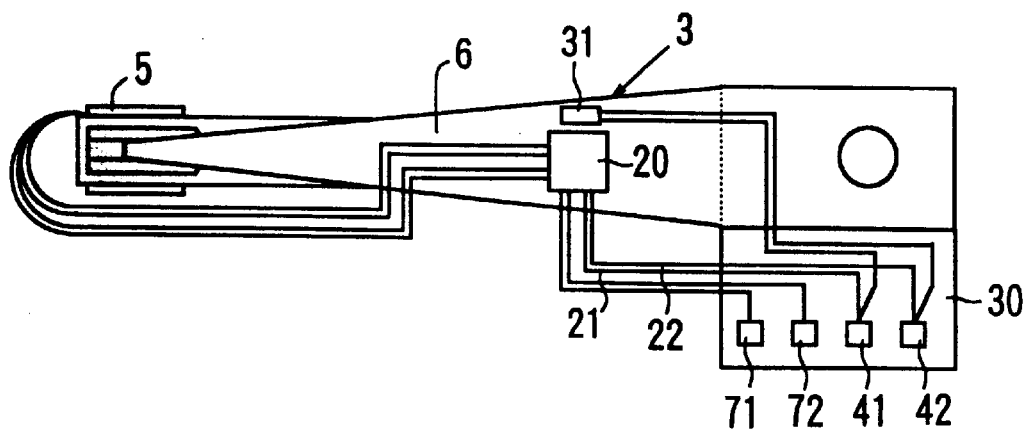
FIG. 33 is a top view illustrating yet another embodiment of the magnetic head device according to the present invention.
Figure 34:
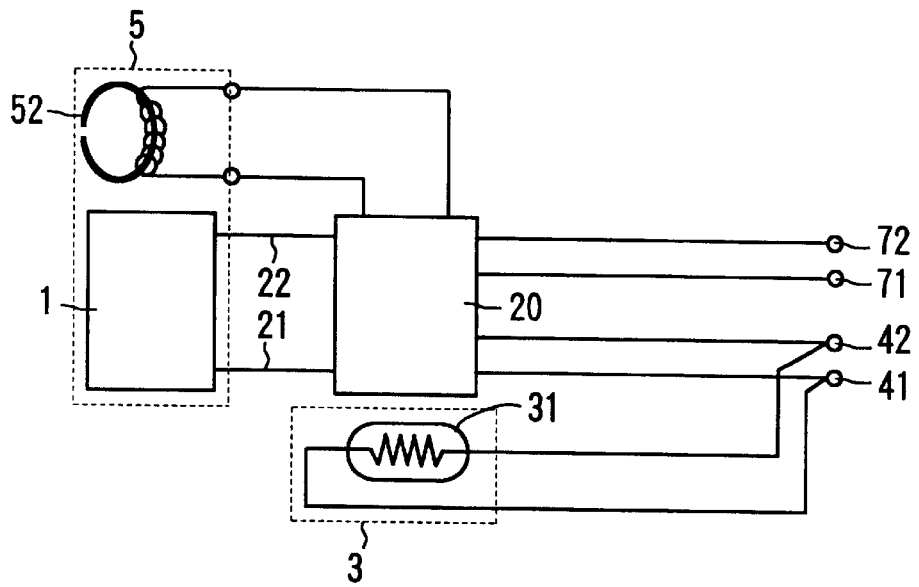
FIG. 34 is an electrical circuit diagram of the magnetic head device illustrated in FIG. 33.

FIG. 33 is a top view illustrating yet another embodiment of the magnetic head device according to the present invention and FIG. 34 is an electrical circuit diagram of the magnetic head device in FIG. 33. The embodiment illustrated in FIGS. 33 and 34 provides a magnetic head device adopting the thin film device illustrated in FIG. 12. The signal processing circuit 20 is mounted on the head support device 6. The signal processing circuit 20, which constitutes a read/write circuit, is connected to the MR element 1 and the recording element 52 (see FIG. 34). The means for switching 3 is constituted of the PTC thermistor element 31 and is thermally linked with the signal processing circuit 20 on the head support device 6.

The signal processing circuit 20 generates heat at a considerable temperature while it performs signal processing. The PTC thermistor element 31 performs a switching operation with the thermal energy which is generated when the signal processing circuit 20 operates.

The board 30 is mounted at the side of the head support device 6, and the terminals 71 and 72 for the recording element 52 (see FIG. 34), the terminals 41 and 42 for the MR element 1 and the terminals 43 and 44 for the heating PTC thermistor element 32 are provided on the board 30. The PTC thermistor element 31 is connected to the terminals 41 and 42.

The timing with which the PTC thermistor element 31 constituting the means for switching 3 is driven is the same as that in the embodiment explained earlier in reference to FIG. 12, with the means for switching 3 achieving identical advantages to those achieved in the embodiment illustrated in FIG. 12.

Figure 35:
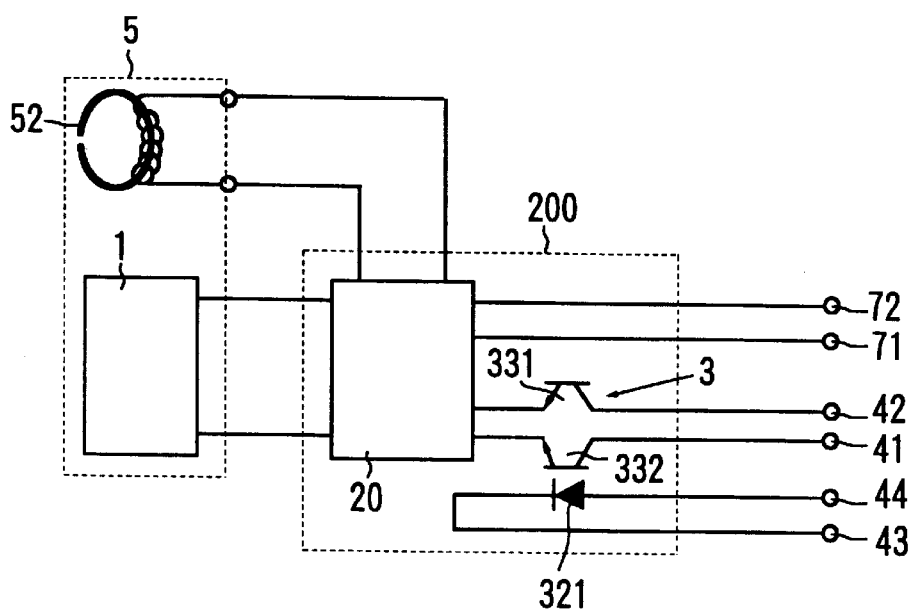
FIG. 35 is an electrical circuit diagram of yet another embodiment of the magnetic head device according to the present invention.

FIG. 35 is an electrical circuit diagram of yet another embodiment of the magnetic head device according to the present invention. This embodiment represents an example that is ideal in applications in which the means for switching 3 is constituted by using semiconductor switches, phototransistors or the like (see FIGS. 7 to 11).

The phototransistors 331 an 332 and the light emitting element 321 constituting the means for switching 3 form an integrated circuit 200 together with the signal processing circuit 20.

Figure 36:
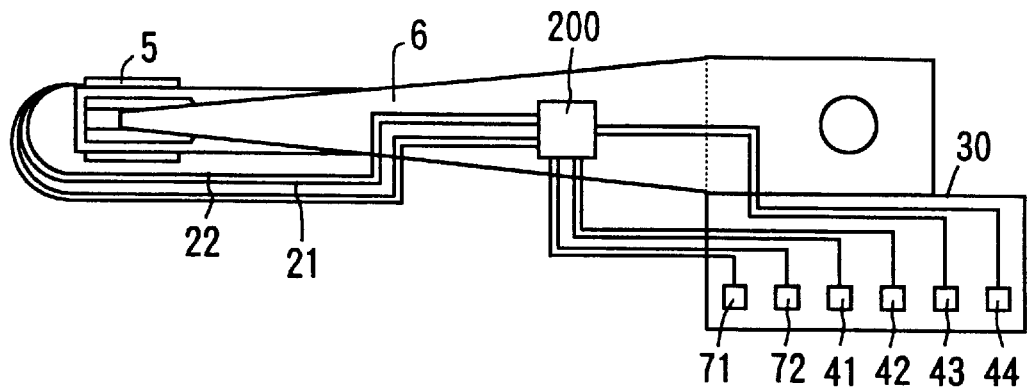
FIG. 36 is a top view of the magnetic head device with its integrated circuit illustrated in FIG. 35 mounted on the head support device.

FIG. 36 is a top view of a magnetic head device achieved by mounting the integrated circuit 200 in FIG. 35 on the head support device 6. The board 30 is mounted at a side of the head support device 6, with the terminals 71 and 72, and 41 to 44 provided at the board 30.

Figure 37:
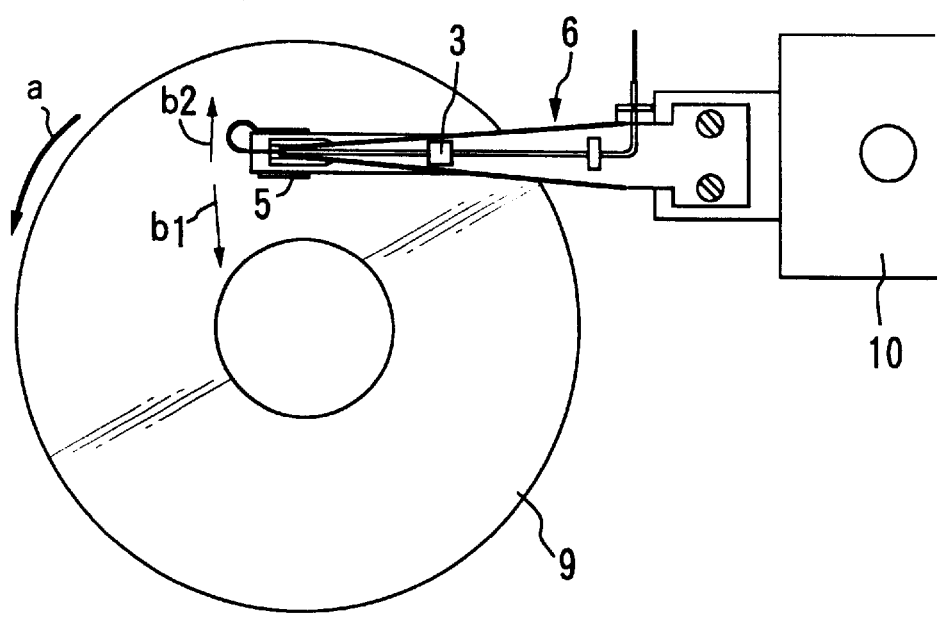
FIG. 37 illustrates the magnetic recording/reproduction apparatus according to the present invention.

FIG. 37 illustrates the magnetic recording/reproduction apparatus according to the present invention. The magnetic recording/reproduction apparatus according to the present invention includes a positioning device 10, a magnetic disk 9, a head support device 6 of the known art and the thin film magnetic head 5 according to the present invention. The magnetic disk 9 is driven to rotate in the direction indicated by the arrow a by a rotary drive mechanism (not shown). The positioning device 10, which adopts the rotary actuator system, supports the one end of the head support device 6 and drives it in the direction indicated by the arrow b1 or b2 at a specific angle (skew angle) on the plane of the magnetic disk 9. Thus, a write into the magnetic disk 9 and a read from the magnetic disk 9 are implemented at a specific track.

As has been explained, according to the present invention, the following advantages are achieved:

(a) A thin film device, a thin film magnetic head device and a magnetic recording/reproduction apparatus, with which the function of electrostatic breakdown prevention can be enabled or disabled with ease are provided.

(b) A thin film device, a thin film magnetic head device and a magnetic recording/reproduction apparatus which allow the function of electrostatic breakdown prevention to be externally provided at the thin film element with ease, are provided.

What is claimed is:

1. A switched electrostatic protection arrangement for a thin film device having a signal input circuit including at least two lead conductors connecting a thin film element inside the thin film device with at least two terminals external of the thin film element, said switched electrostatic protection arrangement comprising:
   a source of energy external to said thin film element; and
   a means for switching directly connected to said at least two lead conductors, wherein said means for switching is also connected to receive energy supplied from the source of energy external to said thin film element for performing a switching operation to selectively provide electrostatic breakdown protection for said thin film element.

2. The arrangement of claim 1 wherein said means for switching includes a thermistor element.

3. The arrangement of claim 2 wherein said means for switching includes a thermistor element having a positive temperature coefficient.

4. The arrangement of claim 3 wherein said thermistor element is directly connected between said at least two lead conductors.

5. The arrangement of claim 2 wherein said means for switching includes a thermistor element having a negative temperature coefficient.

6. The arrangement of claim 5 wherein said thermistor element is directly connected in series to said at least two lead conductors.

7. The arrangement of claim 1 wherein said energy supplied from the source of energy is thermal energy.

8. The arrangement of claim 7, wherein the source of energy is a heat generating element.

9. The arrangement of claim 8 wherein said heat generating element includes a thermistor having a positive temperature coefficient.

10. The arrangement of claim 1 wherein said means for switching includes a semiconductor switch.

11. The arrangement of claim 10 wherein said semiconductor switch includes a phototransistor.

12. The arrangement of claim 10 wherein said semiconductor switch includes a combination of a phototransistor and a light emitting element.

13. The arrangement of claim 10 wherein said semiconductor switch includes a three-terminal switching element.

14. The arrangement of claim 10 wherein said means for switching includes a mechanical means for switching.

15. The arrangement of claim 1 further provided with a signal processing circuit connected to said thin film element; wherein said means for switching is provided at a stage to the rear of said signal processing circuit.

16. The arrangement of claim 15 wherein said source of energy is said signal processing circuit and the energy generated is thermal energy generated when the signal processing circuit operates.

17. The arrangement of claim 1, wherein said thin film element is a magnetic transducer mounted in a thin film device formed as a combined magnetic head and slider.

18. The arrangement of claim 17 further provided with a head support device that supports said thin film magnetic head.

19. The arrangement of claim 17 wherein said thin film element includes a magnetoresistive film.

20. The arrangement of claim 19 wherein said magnetoresistive film includes a multi-layer film structure.

21. The arrangement of claim 20 wherein said magnetoresistive film includes a spin valve film structure.

22. The arrangement of claim 17 further provided with a write element which is mounted on said slider.

23. A magnetic recording/reproducing apparatus comprising:
   a magnetic disk;
   a magnetic disk support and driving mechanism configured to support and rotate the magnetic disk;
   a supporting device configured to support a magnetic head in a position relative to the magnetic disk on the magnetic disk support and driving mechanism to perform recording/reproducing operations between a magnetic transducer in said magnetic head and said magnetic disk, said magnetic transducer comprising a thin film element; and
   a switched electrostatic protection arrangement having a signal input circuit including at least two lead conductors connecting said thin film element inside the thin film device with at least two terminals external of the thin film element, said switched electrostatic protection arrangement comprising,
      a source of energy external to said thin film element, and
      a means for switching directly connected to said at least two lead conductors, wherein said means for switching is also connected to receive energy supplied from the source of energy external to said thin film element for performing a switching operation to selectively provide electrostatic breakdown protection for said thin film element.

24. A thin film device comprising:
   two output terminals;
   two lead conductors connected to said two output terminals;
   a thin film element directly connected to said two lead conductors; and
   at least one switching element directly connected to said two lead conductors, said at least one switching element being configured to be in a closed state when energy is supplied from outside to said at least one switching element and being configured to be in an open state when said energy is not supplied from outside to said at least one switching element.

25. The thin film device of claim 24, wherein said closed state of said at last one switching element provides electrostatic breakdown protection for said thin film element.

26. The thin film device of claim 24 wherein said at least one switching element includes a controllable semiconductor switch.

27. The thin film device of claim 24 wherein said at least one switching element includes a thermistor element having a negative temperature coefficient and said energy is thermal energy.

28. The thin film device of claim 27 further comprising a heat generating element that supplies said thermal energy to said at least one switching element.

29. The thin film device of claim 24 further comprising a source of energy which supplies said energy to said at least one switching element.

30. A thin film device comprising:
   two output terminals;
   two lead conductors connected to said two output terminals;
   a thin film element directly connected to said two lead conductors; and
   at least one switching element directly connected to said two lead conductors, said at least one switching element being configured to be in an open state when energy is supplied from outside to said at least one switching element and being configured to be in a closed state when said energy is not supplied from outside to said at least one switching element.

31. The thin film device of claim 30 where said closed state of said at least one switching element provides electrostatic breakdown protection for said thin film element.

32. The thin film device of claim 30 wherein said at least one switching element includes a controllable semiconductor switch.

33. The thin film device of claim 30 wherein said at least one switching element includes a thermistor element having a positive temperature coefficient and said energy is thermal energy.

34. The thin film device of claim 33 further comprising a heat generating element that supplies said thermal energy to said at least one switching element.

35. The thin film device of claim 30 further comprising a signal processing circuit connected to said film element, wherein said at least one switching element is provided at a stage downstream of said signal processing circuit and is caused to turn to said open state by thermal energy that is generated when said signal processing circuit operates.

36. The thin film device of claim 30 further comprising a source of energy which supplies said energy to said at least one switching element.

37. A thin film device comprising:
   two lead conductors;
   a thin film element direct connected to one end of said two lead conductors;
   two output terminals directly connected to another end of said two lead conductors so as to form two electrical paths between said two output terminals and said thin film element; and
   a first switching element in one of said two electrical paths, said first switching element being configured to be in a closed state when energy is supplied from outside to said first switching element and being configured to be in an open state when said energy is not supplied from outside to said first switching element.

38. The thin film device of claim 37 where said open state of said first switching element provides electrostatic breakdown protection for said thin film element.

39. The thin film device of claim 37 wherein said first switching element includes a controllable semiconductor switch.

40. The thin film device of claim 37 wherein said first switching element includes a thermistor element having a negative temperature coefficient and said energy is thermal energy.

41. The thin film device of claim 40 further comprising a heat generating element that supplies said thermal energy to said first switching element.

42. The thin film device of claim 37 further comprising a signal processing circuit connected to said thin film element, wherein said first switching element is provided at a stage downstream of said signal processing circuit and is caused to turn to the closed state by thermal energy that is generated when said signal processing circuit operates.

43. The thin film device of claim 37 further comprising a source of energy which supplies said energy to said first switching element.

44. The thin film device of claim 37 further comprising a second switching element in another of said two electrical paths, said second switching element being configured to be in a closed state when energy is supplied from outside to said second switching element and being configured to be in an open state when said energy is not supplied from outside to the second switching element.

45. The thin film device of claim 37 further comprising a third switching element directly connected to said two output terminals, said third switching element being configured to be in an open state when energy is supplied from outside to said third switching element and being configured to be in a closed state when said energy is not supplied from outside to said third switching element.

46. A thin film device comprising:
   two lead conductors;
   a thin film element directly connected to one end of said two lead conductors;
   two output terminals directly connected to another end of said two lead conductors so as to form two electrical paths between said two output terminals and said thin film element; and
   a first switching element in one of said two electrical paths, said first switching element being configured to be in an open state when energy is supplied from outside to said first switching element and being configured to be in a closed state when said energy is not supplied from outside to said first switching element.

47. The thin film device of claim 46 wherein said open state of said first switching element provides electrostatic breakdown protection for said thin film element.

48. The thin film device of claim 46 wherein said first switching element includes a controllable semiconductor switch.

49. The thin film device of claim 46 wherein said first switching element includes a thermistor element having a positive temperature coefficient and said energy is thermal energy.

50. The thin film device of claim 49 further comprising a heat generating element that supplies said thermal energy to said first switching element.

51. The thin film device of claim 46 further comprising a source of energy which supplies said energy to said first switching element.

52. The thin film device of claim 46 further comprising a second switching element in another of said two electrical paths, said second switching element being configured to be in an open state when energy is supplied from outside to said second switching element and said second switching element being configured to be in a closed state when said energy is not supplied from outside to said second switching element.

53. The thin film device of claim 46 further comprising a third switching element directly connected to said two output terminals, said third switching element being configured to be in a closed state when energy is supplied from outside to said third switching element and being configured to be in an open state when said energy is not supplied from outside to said third switching element.

54. A magnetic head device comprising:
a head support device;
a magnetic head including a thin film magnetic transducer element, said magnetic head being supported by said head support device;
two lead conductors directly connected to said thin film magnetic transducer element;
two output terminals to which said two lead conductors are connected; and
at least one switching element directly connected to said two lead conductors, said at least one switching element being configured to be in a closed state when energy is supplied from outside to said at least one switching element and being configured to be in an open state when said energy is not supplied from outside to said at least one switching element.

55. A magnetic head device comprising:
a head support device;
a magnetic head including a thin film magnetic transducer element, said magnetic head being supported by said head support device;
two lead conductors directly connected to said thin film magnetic transducer element;
two output terminals to which said two lead conductors are connected; and
at least one switching element directly connected to said two lead conductors, said at least one switching element being configured to be in an open state when energy is supplied from outside to said at least one switching element and being configured to be in a closed state when said energy is not supplied from outside to said at least one switching element.

56. A magnetic head device comprising:
a head support device;
a magnetic head including a thin film magnetic transducer element, said magnetic head being supported by said head support device;
two lead conductors, one end of said two lead conductors directly connected to said thin film magnetic transducer element;
two output terminals directly connected to another end of said two lead conductors so as to form two electrical paths between said two output terminals and said thin film magnetic transducer element; and
a first switching element in one of said two electrical paths, said first switching element being configured to be in a closed state when energy is supplied from outside to said first switching element and being configured to be in an open state when said energy is not supplied from outside to said first switching element.

57. A magnetic head device comprising:
a head support device;
a magnetic head including a thin film magnetic transducer element, said magnetic head being supported by said head support device;
two lead conductors, one end of said two lead conductors directly connected to said thin film magnetic transducer element;
two output terminals directly connected to another end of said two lead conductors so as to form two electrical paths between said two output terminals and said thin film magnetic transducer element; and
a first switching element in one of said two electrical paths, said first switching element being configured to be in an open state when energy is supplied from outside to said first switching element and being configured to be in a closed state when said energy is not supplied from outside to said first switching element.

58. A magnetic recording/reproduction apparatus comprising:
a magnetic disk that is driven to rotate; and
a magnetic head device which performs recording/reproduction operations relative to said magnetic disk, said magnetic head device comprising:
a head support device;
a magnetic head including a thin film magnetic transducer element, said magnetic head being supported by said head support device,
two lead conductors directly connected to said thin film magnetic transducer element,
two output terminals to which said two lead conductors are connected, and
at least one switching element directly connected to said two lead conductors, said at least one switching element being configured to be in a closed state when energy is supplied from outside to said at least one switching element and being configured to be in an open state when said energy is not supplied from outside to said at least one switching element.

59. A magnetic recording/reproduction apparatus comprising:
a magnetic disk that is driven to rotate; and
a magnetic head device which performs recording/reproduction operations relative to said magnetic disk, said magnetic head device comprising,
a head support device,
a magnetic head including a thin film magnetic transducer element, said magnetic head being supported by said head support device,
two lead conductors directly connected to said thin film magnetic transducer element,
two output terminals to which said two lead conductors are connected, and
at least one switching element directly connected to said two lead conductors, said at least one switching element being configured to an open state when energy is supplied from outside to said at least one switching element and being configured to be in a closed state when said energy is not supplied from outside to said at least one switching element.

60. A magnetic recording/reproduction apparatus comprising:
- a magnetic disk that is driven to rotate; and
- a magnetic head device which performs recording/reproduction operations relative to said magnetic disk, said magnetic head device comprising,
  - a head support device,
  - a magnetic head including a thin film magnetic transducer element, said magnetic head being supported by said head support device,
  - two lead conductors, one end of said two lead conductors directly connected to said thin film magnetic transducer element,
  - two output terminals directly connected to another end of said two lead conductors so as to form two electrical paths between said two output terminals and said thin film magnetic transducer element, and
  - a first switching element in one of said two electrical paths, said first switching element being configured to be in a closed state when energy is supplied from outside to said first switching element and being configured to be in an open state when said energy is not supplied from outside to said first switching element.

61. A magnetic recording/reproduction apparatus comprising:
- a magnetic disk that is driven to rotate; and
- a magnetic head device which performs recording/reproduction operations relative to said magnetic disk, said magnetic head device comprising,
  - a head support device,
  - a magnetic head including a thin film magnetic transducer element, said magnetic head being supported by said head support device,
  - two lead conductors, one end of said two lead conductors directly connected to said thin film magnetic transducer element,
  - two output terminals directly connected to another end of said two lead conductors so as to form two electrical paths between said two output terminals and said thin film magnetic transducer element, and
  - a first switching element in one of said two electrical paths, said first switching element being configured to be in an open state when energy is supplied from outside to said first switching element and being configured to be in a closed state when said energy is not supplied from outside to said first switching element.

* * * * *